United States Patent
Nishi et al.

(10) Patent No.: US 9,621,871 B2
(45) Date of Patent: Apr. 11, 2017

(54) IMAGE CODING METHOD, IMAGE DECODING METHOD, IMAGE CODING APPARATUS, AND IMAGE DECODING APPARATUS

(75) Inventors: Takahiro Nishi, Nara (JP); Tadamasa Toma, Osaka (JP); Taiji Sasaki, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 139 days.

(21) Appl. No.: 13/369,786

(22) Filed: Feb. 9, 2012

(65) Prior Publication Data

US 2012/0133736 A1 May 31, 2012

Related U.S. Application Data

(63) Continuation of application No. PCT/JP2011/004381, filed on Aug. 3, 2011.

(Continued)

(51) Int. Cl.
*H04N 13/00* (2006.01)
*H04N 19/597* (2014.01)
(Continued)

(52) U.S. Cl.
CPC ......... *H04N 13/0048* (2013.01); *H04N 19/30* (2014.11); *H04N 19/597* (2014.11); *H04N 19/70* (2014.11)

(58) Field of Classification Search
USPC ...................................... 348/42–60; 382/154
See application file for complete search history.

(56) References Cited

U.S. PATENT DOCUMENTS 6,091,772 A * 7/2000 Anderson et al. ....... 375/240.26
7,679,616 B2   3/2010 Nomura et al.
(Continued)

FOREIGN PATENT DOCUMENTS

CN    1745589    3/2006
CN  101511017    8/2009
(Continued)

OTHER PUBLICATIONS

Haskell, B., & Puri, A. (1997). MPEG-2 Systems. In Digital video an introduction to MPEG-2 (pp. 50-52). New York: Chapman & Hall. ISBN: 978-0412084119.*
ITU-T Rec. H.222.0 | ISO/IEC 13818-1 "Information technology— Generic coding of moving pictures and associated audio information: Systems" (May 2006).
ISO/IEC 13818-1: 2007/Amendment 4: "Transport of multiview video over Rec. ITU-T H.222.0" (Dec. 2009).
(Continued)

*Primary Examiner* — Dave Czekaj
*Assistant Examiner* — Shanika Brumfield
(74) *Attorney, Agent, or Firm* — Wenderoth, Lind & Ponack, L.L.P.

(57) ABSTRACT

An image coding method for properly handling a 3D video format including a base layer and an enhancement layer includes a video layer and a system layer. The video layer includes a step of coding an image to generate a coded stream. The system layer includes a step of multiplexing the coded stream and an identifier to generate a system stream, the identifier indicating whether or not the image has a left-right mixed format that includes a base layer and an enhancement layer and that has a left view image area and a right view image area in each picture. In the coding step, the image that includes the base layer and the enhancement layer and that has the left view image area and the right view image area in each picture is coded to generate the coded stream, when the image has the left-right mixed format.

20 Claims, 36 Drawing Sheets

| Syntax | No. of bits | Mnemonic |
|---|---|---|
| SVC_extension_descriptor() { | | |
|   descriptor_tag | 8 | uimsbf |
|   descriptor_length | 8 | uimsbf |
|   width | 16 | uimsbf |
|   height | 16 | uimsbf |
|   frame_rate | 16 | uimsbf |
|   average_bitrate | 16 | uimsbf |
|   maximum_bitrate | 16 | uimsbf |
|   dependency_id | 3 | bslbf |
|   reserved | 5 | bslbf |
|   quality_id_start | 4 | bslbf |
|   quality_id_end | 4 | bslbf |
|   temporal_id_start | 3 | bslbf |
|   temporal_id_end | 3 | bslbf |
|   no_sei_nal_unit_present | 1 | bslbf |
|   reserved | 1 | bslbf |
| } | | |

Replace reserved with the following

| frame_packing_info_present_flag | 1 | bslbf |
|---|---|---|

Related U.S. Application Data

(60) Provisional application No. 61/371,827, filed on Aug. 9, 2010.

(51) Int. Cl.
*H04N 19/70* (2014.01)
*H04N 19/30* (2014.01)

(56) References Cited

U.S. PATENT DOCUMENTS

| | | | |
|---|---|---|---|
| 8,331,433 | B2 | 12/2012 | Kim et al. |
| 2003/0043923 | A1 | 3/2003 | Zhang et al. |
| 2005/0244050 | A1* | 11/2005 | Nomura et al. ............. 382/154 |
| 2005/0248561 | A1 | 11/2005 | Ito et al. |
| 2006/0039480 | A1 | 2/2006 | Seo |
| 2006/0078180 | A1 | 4/2006 | Berretty et al. |
| 2007/0147502 | A1* | 6/2007 | Nakamura ............. 375/240.12 |
| 2008/0056352 | A1 | 3/2008 | Kim et al. |
| 2008/0089428 | A1* | 4/2008 | Nakamura et al. ...... 375/240.26 |
| 2009/0116558 | A1 | 5/2009 | Chen et al. |
| 2010/0134592 | A1 | 6/2010 | Kim et al. |
| 2010/0165077 | A1* | 7/2010 | Yin et al. ........................ 348/42 |

FOREIGN PATENT DOCUMENTS

| | | | |
|---|---|---|---|
| EP | 1 631 088 | | 3/2006 |
| JP | 2-126788 | | 5/1990 |
| JP | 2003-319416 | | 11/2003 |
| JP | 2003319416 A | * 11/2003 | ............ H04N 13/02 |
| KR | 10-2008-0020314 | | 3/2008 |
| KR | 10-2010-0060884 | | 6/2010 |
| RU | 2 384 010 | | 3/2010 |
| WO | 03/092304 | | 11/2003 |
| WO | 2010/010077 | | 1/2010 |
| WO | 2010/041896 | | 4/2010 |

OTHER PUBLICATIONS

Recommendation H.222.0 (2006) Amendment 4: "Transport of multiview video over Rec. ITU-T H.222.0 | ISO/IEC 13818-1" (Dec. 2009).

ISO/IEC 13818-1: 2007/Amendment 3: Transport of scalable video over Rec. ITU-T H.222.0 (Nov. 2009).

Recommendation H.222.0 (2006) Amendment 3: "Transport of scalable video over Rec. ITU-T H.222.0 | ISO/IEC 13818-1" (Mar. 2009).

Decision of Grant issued Dec. 11, 2013 in corresponding Russian Application No. 2012106255, with English translation.

Office Action issued Jan. 21, 2014 in corresponding Canadian Application No. 2,771,433.

Extended European Search Report issued Nov. 18, 2014 in corresponding European Application No. 11815658.7.

Walt Husak, "Coding Performance in a Frame Compatible Environment", International Organisation for Standardisation, ISO/IEC JTC1/SC29/WG11 MPEG2010/M17945, Coding of Moving Pictures and Audio, Geneva, Switzerland, Jul. 2010.

Aljoscha Smolic et al., "An Overview of Available and Emerging 3D Video Formats and Depth Enhanced Stereo as Efficient Generic Solution", Picture Coding Symposium, May 6, 2009.

Alexis Michael Tourapis et al., "A Frame Compatible System for 3D Delivery", International Organisation for Standardisation, ISO/IEC JTC1/SC29/WG11 MPEG2010/M17925, Coding of Moving Pictures and Audio, Geneva, Switzerland, Jul. 2010.

Summons to Attend Oral Proceedings dated Jun. 16, 2016 in European Application No. 11815658.7.

Kim et al., "Real-Time Synchronous Multi-View Video Transport System over IP Networks," IEEE Transactions on Consumer Electronics, vol. 54, No. 2, May 1, 2008, pp. 460-467, XP011229920.

* cited by examiner

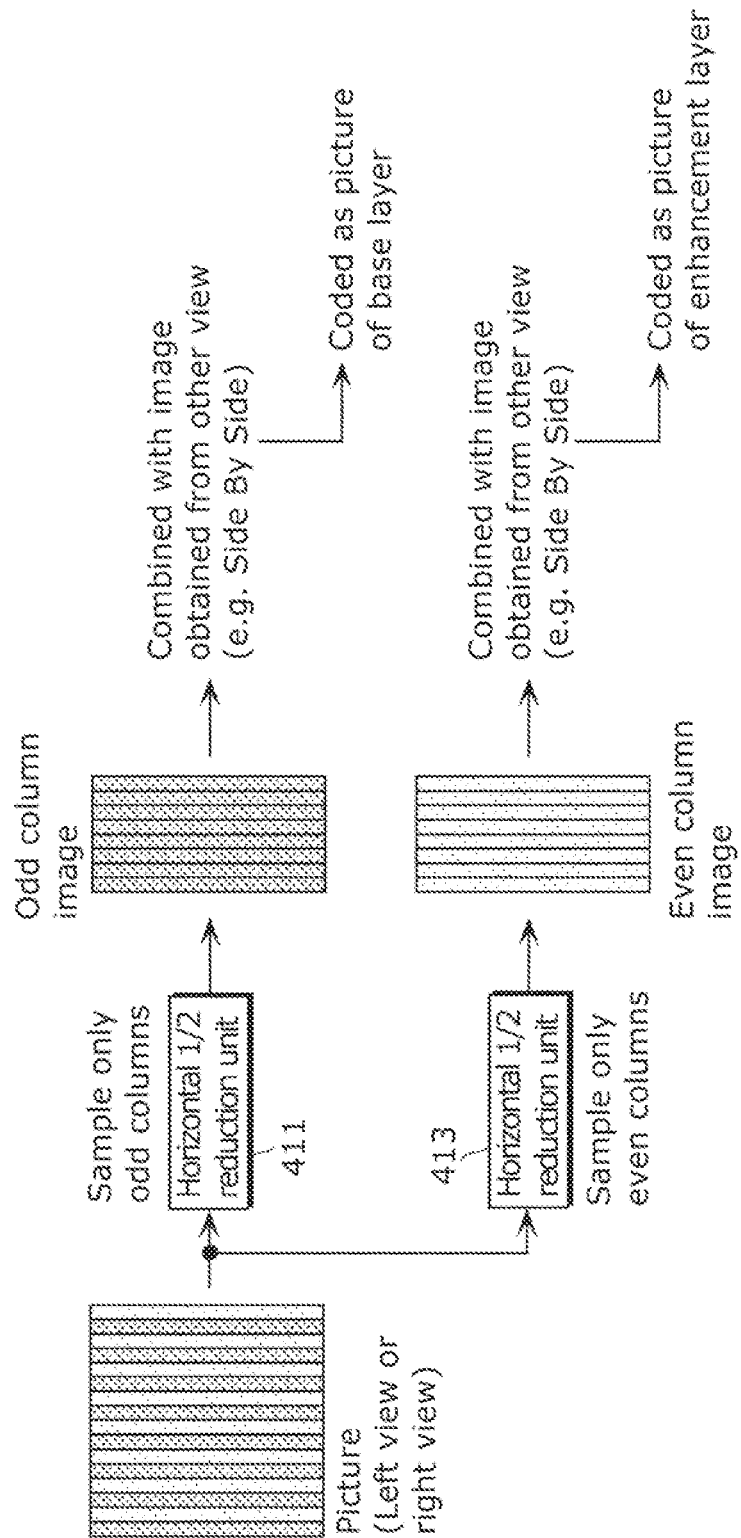

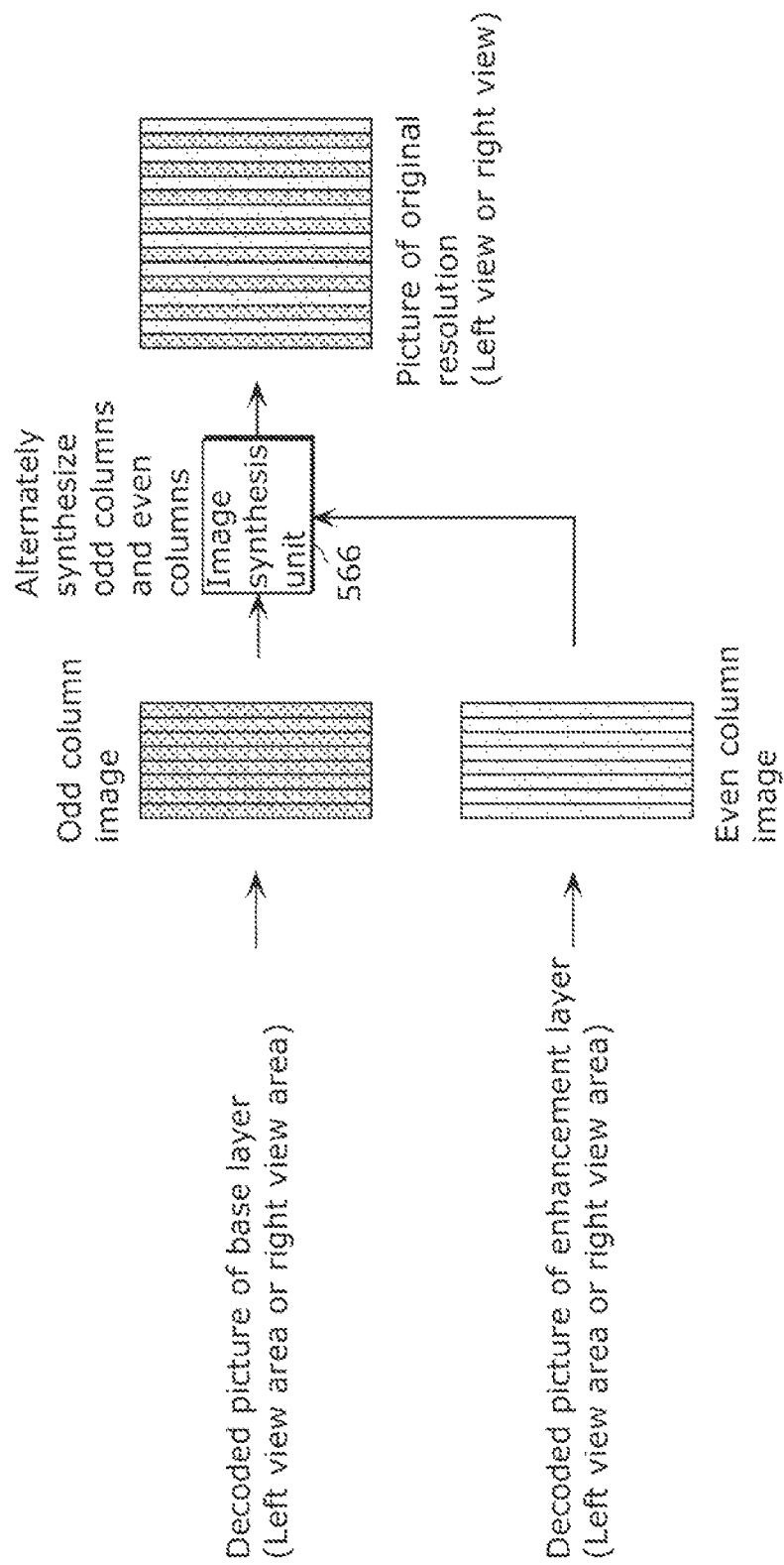

FIG. 6

| Syntax | No. of bits | Mnemonic |
|---|---|---|
| MVC_extension_descriptor() { | | |
|     descriptor_tag | 8 | uimsbf |
|     descriptor_length | 8 | uimsbf |
|     average_bit_rate | 16 | uimsbf |
|     maximum_bitrate | 16 | uimsbf |
|     reserved | 4 | bslbf |
|     view_order_index_min | 10 | bslbf |
|     view_order_index_max | 10 | bslbf |
|     temporal_id_start | 3 | bslbf |
|     temporal_id_end | 3 | bslbf |
|     no_sei_nal_unit_present | 1 | bslbf |
|     no_prefix_nal_unit_present | 1 | bslbf |
| } | | |

Add the following two lines

| | | |
|---|---|---|
| frame_packing_info_present_flag | 1 | bslbf |
| reserved | 7 | bslbf |

FIG. 7

| Syntax | No. of bits | Mnemonic |
|---|---|---|
| MVC_extension_descriptor() { | | |
|     descriptor_tag | 8 | uimsbf |
|     descriptor_length | 8 | uimsbf |
|     average_bit_rate | 16 | uimsbf |
|     maximum_bitrate | 16 | uimsbf |
|     reserved | 4 | bslbf |
|     view_order_index_min | 10 | bslbf |
|     view_order_index_max | 10 | bslbf |
|     temporal_id_start | 3 | bslbf |
|     temporal_id_end | 3 | bslbf |
|     no_sei_nal_unit_present | 1 | bslbf |
|     no_prefix_nal_unit_present | 1 | bslbf |
| } | | |

Replace reserved with the following

| | | |
|---|---|---|
| frame_packing_info_present_flag | 1 | bslbf |
| reserved | 3 | bslbf |

FIG. 10

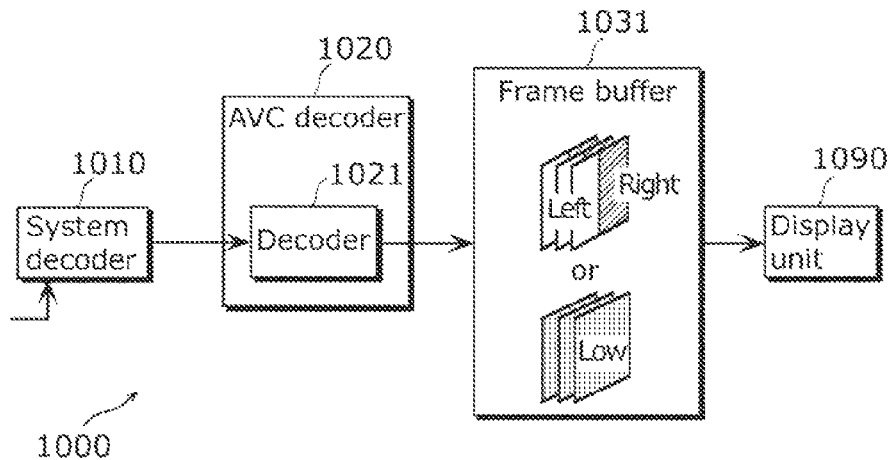

FIG. 11

| Syntax | No. of bits | Mnemonic |
|---|---|---|
| SVC_extension_descriptor() { | | |
|     descriptor_tag | 8 | uimsbf |
|     descriptor_length | 8 | uimsbf |
|     width | 16 | uimsbf |
|     height | 16 | uimsbf |
|     frame_rate | 16 | uimsbf |
|     average_bitrate | 16 | uimsbf |
|     maximum_bitrate | 16 | uimsbf |
|     dependency_id | 3 | bslbf |
|     reserved | 5 | bslbf |
|     quality_id_start | 4 | bslbf |
|     quality_id_end | 4 | bslbf |
|     temporal_id_start | 3 | bslbf |
|     temporal_id_end | 3 | bslbf |
|     no_sei_nal_unit_present | 1 | bslbf |
|     reserved | 1 | bslbf |
| } | | |

Replace reserved with the following

| frame_packing_info_present_flag | 1 | bslbf |

Example of box structure

Example of MP4 file structure

FIG. 34
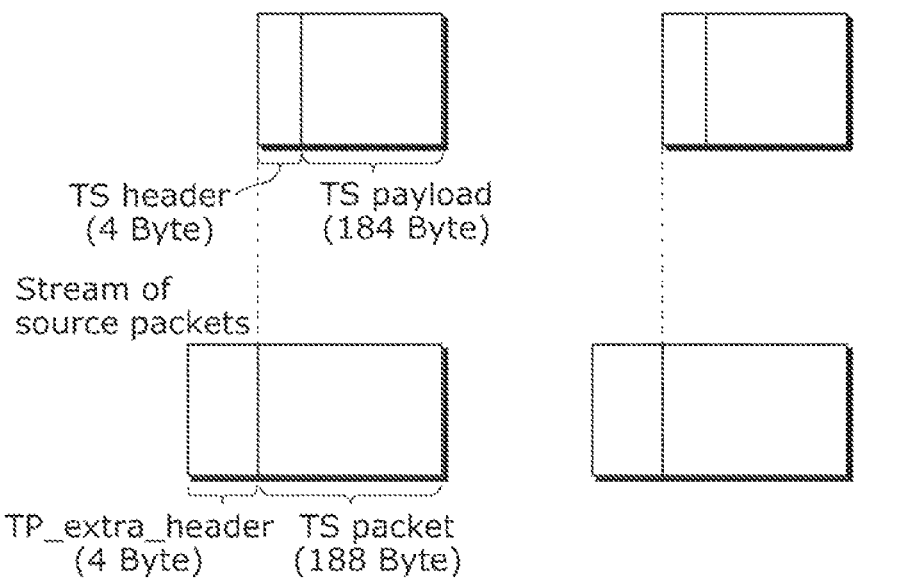
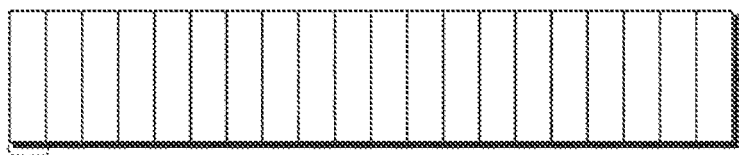

| Corresponding standard | Driving frequency |
|---|---|
| MPEG4. AVC | 500 MHz |
| MPEG2 | 350 MHz |
| ⋮ | ⋮ |

ID OF THE INVENTION # IMAGE CODING METHOD, IMAGE DECODING METHOD, IMAGE CODING APPARATUS, AND IMAGE DECODING APPARATUS

CROSS REFERENCE TO RELATED APPLICATIONS

This is a continuation application of PCT Patent Application No. PCT/JP2011/004381 filed on Aug. 3, 2011, designating the United States of America, which is based on and claims priority of U.S. Provisional Patent Application Ser. No. 61/371,827 filed on Aug. 9, 2010. The entire disclosures of the above-identified applications, including the specifications, drawings and claims are incorporated herein by reference in their entirety.

BACKGROUND OF THE INVENTION (1) Field of the Invention

The present invention relates to an image coding method that includes: a video layer of generating a coded stream by coding an image composed of one or more pictures; and a system layer of generating a system stream for transmitting or storing the coded stream.

(2) Description of the Related Art

ITU-T (International Telecommunication Union Telecommunication Standardization Sector) Recommendation H.264 has an extension standard called Scalable Video Coding (SVC) for achieving spatial scalability and temporal scalability.

SVC ensures scalability by a plurality of layers that include a base layer, an enhancement layer, and the like. For example, a low-resolution image is obtained from the base layer, and a high-resolution image is obtained from the enhancement layer.

In SVC, spatial scalability means scalability in image resolution, image size, or the like, whereas temporal scalability means scalability in frame rate or the like. Managing them in a plurality of levels achieves graduated quality.

ITU-T Recommendation H.264 also has an extension standard called Multiview Video Coding (MVC) that enables efficient coding of a plurality of images for a plurality of views.

In MVC, a plurality of images for a plurality of views that include a base view (also referred to as an independent view) and a non-base view (also referred to as a dependent view) are coded. The coding may be performed using inter-view prediction. For example, a non-base view image is coded using a base view image as a predictive image. This improves coding efficiency.

Non Patent Literatures (NPL) 1 to 5 describe standards for identifying the above-mentioned extension standards in MPEG-2 Systems for coding images and audio.
[NPL 1]
  ITU-T Rec. H.222.0 | ISO/IEC 13818-1
[NPL 2]
  ISO/IEC 13818-1: 2007/Amd 4: 2009
[NPL 3]
  Recommendation H.222.0 (2006) Amendment 4 (December 2009) "Transport of multiview video over ITU-T Rec. H.222.0 | ISO/IEC 13818-1"
[NPL 4]
  ISO/IEC 13818-1: 2007/Amd 3: 2009
[NPL 5]
  Recommendation H.222.0 (2006) Amendment 3 (March 2009) "Transport of scalable video over ITU-T Rec. H.222.0 | ISO/IEC 13818-1"

SUMMARY OF THE INVENTION

However, the conventional SVC lacks specifications for handling 3D images, and so cannot handle 3D images. The conventional MVC can handle 3D images, but cannot handle 3D images at different resolutions.

For instance, there is a video format called SBS (Side By Side) that divides an image area into two areas of left and right and arranges an image for the left eye in the left area and an image for the right eye in the right area. In SBS, a resolution of each side is half of a normal resolution. In detail, in an environment of Full HD with a resolution of 1920 pixels×1080 pixels, each side in SBS has half of the resolution of Full HD.

The conventional SVC and the conventional MVC have no function of coding an image using the SBS video format so that the base layer provides half of the resolution of Full HD and the enhancement layer provides the resolution of Full HD.

Suppose an image is coded in the SBS video format according to the conventional MVC or the conventional SVC. It is difficult to distinguish a bit stream obtained using SBS and a bit stream obtained without using SBS, from each other. In more detail, it is difficult to in determine the difference between the video formats, in a system layer in NPL 1 (ITU-T Rec. H.222.0 | ISO/IEC 13818-1) and the like. An image decoding apparatus needs a complex structure to determine such a difference.

In view of this, the present invention has an object of providing an image coding method and an image decoding method that can properly handle a 3D video format including a base layer and an enhancement layer.

To solve the stated problem, an image coding method according to the present invention is an image coding method including: a video layer of generating a coded stream by coding an image composed of one or more pictures; and a system layer of generating a system stream for transmitting or storing the coded stream, the video layer including coding the image to generate the coded stream, and the system layer including multiplexing the coded stream generated in the coding and an identifier to generate the system stream, the identifier indicating whether or not a format of the image is a left-right mixed format that includes a base layer and an enhancement layer for providing a plurality of degrees of accuracy and that has a left view image area and a right view image area in each picture, wherein the coding includes, in the case where the format of the image is the left-right mixed format, coding the image that includes the base layer and the enhancement layer and that has the left view image area and the right view image area in each picture, to generate the coded stream.

Thus, the image coding method according to the present invention can generate the system stream that enables determination in the system layer on the decoding side whether or not the image has the left-right mixed format. The image coding method according to the present invention can therefore properly handle the 3D video format including the base layer and the enhancement layer.

Moreover, the system layer may be compliant with MPEG-2 Systems, wherein the video layer is compliant with a multiview video coding scheme, the coding includes coding the image according to the multiview video coding scheme to generate the coded stream, and the multiplexing includes inserting the identifier in a descriptor for the multiview video coding scheme, and multiplexing the coded stream and the descriptor that includes the identifier, to generate the system stream.

Thus, the image is coded according to the multiview video coding scheme, and the identifier is inserted in the descriptor for the multiview video coding scheme. The image coding method according to the present invention can therefore generate the proper system stream using the descriptor.

Moreover, the video layer may be compliant with H.264 MVC, wherein the descriptor for the multiview video coding scheme is an MVC descriptor for H.264 MVC, the coding includes coding the image according to H.264 MVC to generate the coded stream, and the multiplexing includes inserting the identifier in the MVC descriptor for H.264 MVC, and multiplexing the coded stream and the MVC descriptor that includes the identifier, to generate the system stream.

Thus, the image is coded according to H.264 MVC, and the identifier is inserted in the MVC descriptor for H.264 MVC. The image coding method according to the present invention can therefore generate the proper system stream using the MVC descriptor.

Moreover, the coding may include: coding the image of the left-right mixed format in the case where the format of the image is the left-right mixed format; and coding the image of a left-right independent format in the case where the format of the image is not the left-right mixed format, the left-right independent format being a format that includes a picture of a left view and a picture of a right view as separate pictures.

Thus, the image coding method according to the present invention can code the image of the left-right mixed format or the image of the left-right independent format.

Moreover, the system layer may be compliant with MPEG-2 Systems, wherein the video layer compliant with a scalable video coding scheme, the coding includes coding the image according to the scalable video coding scheme to generate the coded stream, and the multiplexing includes inserting the identifier in a descriptor for the scalable video coding scheme, and multiplexing the coded stream and the descriptor that includes the identifier, to generate the system stream.

Thus, the image is coded according to the scalable video coding scheme, and the identifier is inserted in the descriptor for the scalable video coding scheme. The image coding method according to the present invention can therefore generate the proper system stream using the descriptor.

Moreover, the video layer may be compliant with H.264 SVC, wherein the descriptor for the scalable video coding scheme is an SVC descriptor for H.264 SVC, the coding includes coding the image according to H.264 SVC to generate the coded stream, and the multiplexing includes inserting the identifier in the SVC descriptor for H.264 SVC, and multiplexing the coded stream and the SVC descriptor that includes the identifier, to generate the system stream.

Thus, the image is coded according to H.264 SVC, and the identifier is inserted in the SVC descriptor for H.264 SVC. The image coding method according to the present invention can therefore generate the proper system stream using the SVC descriptor.

Moreover, the coding may include: coding the image for stereoscopic display in the case where the format of the image is the left-right mixed format; and coding the image for monoscopic display in the case where the format of the image is not the left-right mixed format.

Thus, the image coding method according to the present invention can code the image for stereoscopic display or the image for monoscopic display.

Moreover, the image coding method may further include generating the image in the left-right mixed format by (i) generating, as a picture of the base layer, a picture in which a first portion of a left picture that is a picture of a left view is included in the left view image area and a second portion of a right picture that is a picture of a right view is included in the right view image area, and (ii) generating, as a picture of the enhancement layer, a picture in which a third portion of the left picture is included in the left view image area and a fourth portion of the right picture is included in the right view image area, the third portion being different from the first portion, and the fourth portion being different from the second portion, wherein the coding includes coding the image generated in the generating to generate the coded stream, when coding the image of the left-right mixed format.

Thus, the picture of the enhancement layer is generated from the portion different from the portion that corresponds to the picture of the base layer. Such picture of the base layer and picture of the enhancement layer achieve graduated accuracy.

Moreover, the image coding method may further include generating the image in the left-right mixed format by (i) generating, as a picture of the base layer, a picture in which a first portion of a left picture that is a picture of a left view is included in the left view image area and a second portion of a right picture that is a picture of a right view is included in the right view image area, and (ii) generating, as a picture of the enhancement layer, a picture in which the whole left picture or a third portion of the left picture is included in the left view image area and the whole right picture or a fourth portion of the right picture is included in the right view image area, the third portion including the first portion, and the fourth portion including the second portion, wherein the coding includes coding the image generated in the generating to generate the coded stream, when coding the image of the left-right mixed format.

Thus, the picture of the enhancement layer is generated from the portion including the portion that corresponds to the picture of the base layer. Such picture of the base layer and picture of the enhancement layer achieve graduated accuracy.

An image decoding method according to the present invention may be an image decoding method including: a system layer of obtaining, from a system stream for transmitting or storing a coded stream that includes an image composed of one or more pictures, the coded stream; and a video layer of decoding the image included in the coded stream, the system layer including demultiplexing the system stream into the coded stream and an identifier to obtain the coded stream and the identifier, the identifier indicating whether or not a in format of the image is a left-right mixed format that includes a base layer and an enhancement layer for providing a plurality of degrees of accuracy and that has a left view image area and a right view image area in each picture, the video layer including decoding the image included in the coded stream obtained in the demultiplexing, and the image decoding method further including outputting the image decoded in the decoding, in an output mode specified according to the identifier obtained in the demultiplexing, wherein the decoding includes, in the case where the format of the image is the left-right mixed format, decoding the image that includes the base layer and the enhancement layer and that has the left view image area and the right view image area in each picture.

Thus, the image decoding method according to the present invention can switch the output mode of the image according to the identifier indicating whether or not the image has the left-right mixed format. The image decoding method according to the present invention can therefore properly handle the 3D video format including the base layer and the enhancement layer.

Moreover, the system layer may be compliant with MPEG-2 Systems, wherein the video layer is compliant with a multiview video coding scheme, the demultiplexing includes demultiplexing the system stream into the coded stream and a descriptor for the multiview video coding scheme, to obtain the coded stream and the identifier included in the descriptor, and the decoding includes decoding the image coded according to the multiview video coding scheme.

Thus, the image decoding method according to the present invention can decode the image coded according to the multiview video coding scheme, and obtain the identifier from the descriptor for the multiview video coding scheme. The image decoding method according to the present invention can therefore properly handle the left-right mixed format.

Moreover, the video layer may be compliant with H.264 MVC, wherein the descriptor for the multiview video coding scheme is an MVC descriptor for H.264 MVC, the demultiplexing includes demultiplexing the system stream into the coded stream and the MVC descriptor for H.264 MVC, to obtain the coded stream and the identifier included in the MVC descriptor, and the decoding includes decoding the image coded according to H.264 MVC.

Thus, the image decoding method according to the present invention can decode the image coded according to H.264 MVC, and obtain the identifier from the MVC descriptor for H.264 MVC. The image decoding method according to the present invention can therefore properly handle the left-right mixed format.

Moreover, the decoding may include: decoding the image of the left-right mixed format in the case where the format of the image is the left-right mixed format; and decoding the image of a left-right independent format in the case where the format of the image is not the left-right mixed format, the left-right independent format being a format that includes a picture of a left view and a picture of a right view as separate pictures.

Thus, the image decoding method according to the present invention can decode the image of the left-right mixed format or the image of the left-right independent format.

Moreover, the system layer may be compliant with MPEG-2 Systems, wherein the video layer is compliant with a scalable video coding scheme, the demultiplexing includes demultiplexing the system stream into the coded stream and a descriptor for the scalable video coding scheme, to obtain the coded stream and the identifier included in the descriptor, and the decoding includes decoding the image coded according to the scalable video coding scheme.

Thus, the image decoding method according to the present invention can decode the image coded according to the scalable video coding scheme, and obtain the identifier from the descriptor for the scalable video coding scheme. The image decoding method according to the present invention can therefore properly handle the left-right mixed format.

Moreover, the video layer may be compliant with H.264 SVC, wherein the descriptor for the scalable video coding scheme is an SVC descriptor for H.264 SVC, the demultiplexing includes demultiplexing the system stream into the coded stream and the SVC descriptor for H.264 SVC, to obtain the coded stream and the identifier included in the SVC descriptor, and the decoding includes decoding the image coded according to H.264 SVC.

Thus, the image decoding method according to the present invention can decode the image coded according to H.264 SVC, and obtain the identifier from the SVC descriptor for H.264 SVC. The image decoding method according to the present invention can therefore properly handle the left-right mixed format.

Moreover, the decoding may include: decoding the image for stereoscopic display in the case where the format of the image is the left-right mixed format; and decoding the image for monoscopic display in the case where the format of the image is not the left-right mixed format.

Thus, the image decoding method according to the present invention can decode the image for stereoscopic display or the image for monoscopic display.

Moreover, the image decoding method may further include generating a left picture that is a picture of a left view and a right picture that is a picture of a right view, in the case where the format of the image is the left-right mixed format, wherein the generating includes: obtaining a first portion of the left picture from the left view image area in a base layer picture, the base layer picture being a picture of the base layer and being included in the image decoded in the decoding; obtaining a second portion of the right picture from the right view image area in the base layer picture; obtaining a third portion of the left picture from the left view image area in an enhancement layer picture, the enhancement layer picture being a picture of the enhancement layer and being included in the image decoded in the decoding, the third portion being different from the first portion; obtaining a fourth portion of the right picture from the right view image area in the enhancement layer picture, the fourth portion being different from the second portion; generating the left picture from the obtained first portion and the obtained third portion; and generating the right picture from the obtained second portion and in the obtained fourth portion, and the outputting includes outputting, as the image, the left picture and the right picture generated in the generating, in the case where the format of the image is the left-right mixed format.

Thus, the image decoding method according to the present invention can generate the high-resolution left picture and the high-resolution right picture by combining the picture of the base layer and the picture of the enhancement layer.

Moreover, the image decoding method may further include generating, in the case where the format of the image is the left-right mixed format, a left picture from the left view image area in a decoded picture and a right picture from the right view image area in the decoded picture, the left picture being a picture of a left view, the right picture being a picture of a right view, and the decoded picture being a picture of one of the base layer and the enhancement layer and being included in the image decoded in the decoding, wherein the outputting includes outputting, as the image, the left picture and the right picture generated in the generating, in the case where the format of the image is the left-right mixed format.

Thus, the image decoding method according to the present invention can generate the left picture and the right picture from any of the picture of the base layer and the picture of the enhancement layer. The image decoding method according to the present invention can therefore generate the image having any of the plurality of degrees of accuracy.

An image coding apparatus according to the present invention may be an image coding apparatus including: a video layer unit that generates a coded stream by coding an image composed of one or more pictures; and a system layer unit that generates a system stream for transmitting or storing the coded stream, the video layer unit including a coding unit that codes the image to generate the coded stream, and the system layer unit including a multiplexing unit that multiplexes the coded stream generated by the coding unit and an identifier to generate the system stream, the identifier indicating whether or not a format of the image is a left-right mixed format that includes a base layer and an enhancement layer for providing a plurality of degrees of accuracy and that has a left view image area and a right view image area in each picture, wherein the coding unit, in the case where the format of the image is the left-right mixed format, codes the image that includes the base layer and the enhancement layer and that has the left view image area and the right view image area in each picture, to generate the coded stream.

Thus, the image coding method according to the present invention is implemented as an image coding apparatus.

An image decoding apparatus according to the present invention may be an image decoding apparatus including: a system layer unit that obtains, from a system stream for transmitting or storing a coded stream that includes an image composed of one or more pictures, the coded stream; and a video layer unit that decodes the image included in the coded stream, the system layer unit including a demultiplexing unit that demultiplexes the system stream into the coded stream and an identifier to obtain the coded stream and the identifier, the identifier indicating whether or not a format of the image is a left-right mixed format that includes a base layer and an enhancement layer for providing a plurality of degrees of accuracy and that has a left view image area and a right view image area in each picture, the video layer unit including a decoding unit that decodes the image included in the coded stream obtained by the demultiplexing unit, and the image decoding apparatus further including an output unit that outputs the image decoded by the decoding unit, in an output mode specified according to the identifier obtained by the demultiplexing unit, wherein the decoding unit, in the case where the format of the image is the left-right mixed format, decodes the image that includes the base layer and the enhancement layer and that has the left view image area and the right view image area in each picture. Thus, the image decoding method according to the present invention is implemented as an image % decoding apparatus.

According to the present invention, it is possible to determine in the system layer whether or not the image has the left-right mixed format. The image coding method and the image decoding method in according to the present invention can therefore properly handle the 3D video format including the base layer and the enhancement layer.

BRIEF DESCRIPTION OF THE DRAWINGS

These and other objects, advantages and features of the is invention will become apparent from the following description thereof taken in conjunction with the accompanying drawings that illustrate a specific embodiment of the present invention. In the Drawings:

FIG. 4 is a schematic diagram showing an example of an image reduction method according to Embodiment 1 of the present invention;

FIG. 5 is a schematic diagram showing an example of an image synthesis method according to Embodiment 1 of the present invention;

FIG. 6 is a diagram showing an example of a syntax of an MVC descriptor according to Embodiment 1 of the present invention;

FIG. 7 is a diagram showing another example of the syntax of the MVC descriptor according to Embodiment 1 of the present invention;

FIG. 10 is a block diagram showing another example of the image decoding apparatus according to Embodiment 2 of the present invention;

FIG. 11 is a diagram showing an example of a syntax of an SVC descriptor according to Embodiment 2 of the present invention;

FIG. 34 shows a structure of TS packets and source packets in the multiplexed data;

DESCRIPTION OF THE PREFERRED EMBODIMENTS

The following describes embodiments of the present invention in detail, with reference to drawings. The embodiments described below each represent a preferred embodiment of the present invention. The numerals, forms, materials, components, component layout positions, connections, steps, step sequences, and the like described in the embodiments are merely examples, and should not limit the scope of the present invention. The scope of the present invention is limited only by the claims. Accordingly, the components that are included in the embodiments but are not defined in the independent claims representing the broadest concepts of the present invention are described as not being necessarily required for achieving the object of the present invention but constituting more preferred embodiments.

In the following description, a picture is an image composed of one field or one frame. A view is video which is an image composed of a plurality of pictures. For example, a left view is video for the left eye, and a right view is video for the right eye. The left view and the right view are combined to achieve stereoscopic display. There is an instance where an image is composed of a plurality of pictures, such as when an image is composed of a picture included in the left view and a picture included in the right view.

Moreover, in the following description, a system layer and a video layer are each a process layer (process group) composed of a plurality of processes. The video layer is also referred to as a video coding layer (VCL). A base layer and an enhancement layer are each data.

[Embodiment 1]

Figure 1:
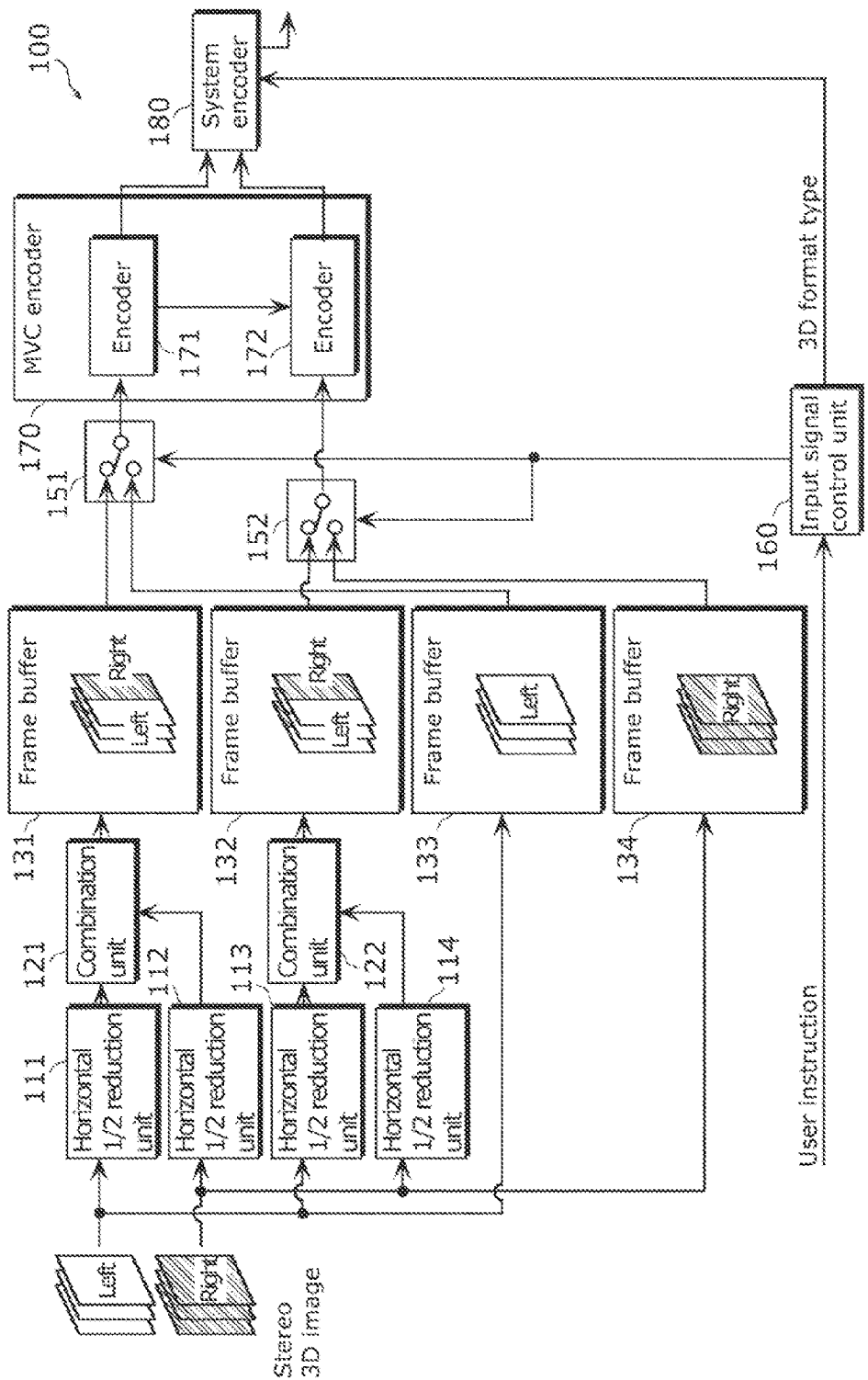
FIG. 1 is a block diagram showing an example of an image coding apparatus according to Embodiment 1 of the present invention.

FIG. 1 is a block diagram showing an example of an image coding apparatus according to Embodiment 1 of the present invention.

An image coding apparatus 100 shown in FIG. 1 includes four horizontal ½ reduction units 111 to 114, two combination units 121 and 122, four frame buffers 131 to 134, two switches 151 and 152, an input signal control unit 160, an MVC encoder 170, and a system encoder 180. The MVC encoder 170 includes two encoders 171 and 172.

The image coding apparatus 100 receives, as an input, a 3D image of a left-right view image independent 3D format (also referred to as a left-right independent format). The left-right view image independent 3D format is a format that includes a picture of the left view and a picture of the right view as separate pictures.

In the image coding apparatus 100, the four horizontal ½ reduction units 111 to 114 and the two combination units 121 and 122 convert the 3D image of the left-right view image independent 3D format to a 3D image of a left-right view pixel mixed 3D format (also referred to as a left-right mixed format). The left-right view pixel mixed 3D format is a format that includes a base layer and an enhancement layer for providing a plurality of degrees of accuracy, and that has a left view image area and a right view image area in each picture.

In more detail, the horizontal ½ reduction unit 111 reduces a left picture which is a picture of the left view, by ½ in a horizontal direction. The horizontal ½ reduction unit 112 reduces a right picture which is a picture of the right view, by ½ in the horizontal direction. The combination unit 121 combines the left picture reduced by the horizontal ½ reduction unit 111 and the right picture reduced by the horizontal ½ reduction unit 112, to generate a picture that includes the left view image area and the right view image area.

The horizontal ½ reduction unit 113 reduces the left picture by ½ in the horizontal direction. The horizontal ½ reduction unit 114 reduces the right picture by ½ in the horizontal direction. The combination unit 122 combines the left picture reduced by the horizontal ½ reduction unit 113 and the right picture reduced by the horizontal ½ reduction unit 114, to generate a picture that includes the left view image area and the right view image area.

In this way, the 3D image of the left-right view image independent 3D format is converted to the 3D image of the left-right view pixel mixed 3D format. The picture generated by the combination unit 121 is stored in the frame buffer 131, and the picture generated by the combination unit 122 is stored in the frame buffer 132.

The encoder 171 in the MVC encoder 170 codes the picture stored in the frame buffer 131, as a picture of the base layer and also as a picture of the base view. The encoder 172 in the MVC encoder 170 codes the picture stored in the frame buffer 132, as a picture of the enhancement-layer and also as a picture of the non-base view. The MVC encoder 170 thus converting the 3D image to two coded bit streams of the base layer and the enhancement layer.

Alternatively, the image coding apparatus 100 inputs the 3D image of the left-right view image independent 3D format to the MVC encoder 170, without converting it to the left-right view pixel mixed 3D format.

That is, the picture of the left view is directly stored in the frame buffer 133, and the picture of the right view is directly stored in the frame buffer 134. The encoder 171 in the MVC encoder 170 codes the picture stored in the frame buffer 133, as the base view. The encoder 172 in the MVC encoder 170 codes the picture stored in the frame buffer 134, as the non-base view.

The MVC encoder 170 thus converts the 3D image to two coded bit streams of the left view and the right view.

The input signal control unit 160 switches the two switches 151 and 152 according to an instruction from the user, thereby switching the pictures inputted to the MVC encoder 170.

For example, in the case where the user instructs the image coding apparatus 100 to code the image in the left-right view pixel mixed 3D format, the pictures stored in the two frame buffers 131 and 132 are inputted to the MVC encoder 170. In the case where the user instructs the image coding apparatus 100 to code the image in the left-right view image independent 3D format, the pictures stored in the two frame buffers 133 and 134 are inputted to the MVC encoder 170.

The system encoder 180 executes system encoding on the two coded bit streams obtained by the MVC encoder 170 and a 3D format type. The system encoder 180 then outputs a system stream including the two coded bit streams and the 3D format type. The 3D format type indicates whether the format of the 3D image is the left-right view pixel mixed 3D format or the left-right view image independent 3D format.

Though this embodiment describes the case where the input signal control unit 160 switches the format of the 3D image based on the user instruction, the format of the 3D image to be coded may be fixed to one of the left-right view pixel mixed 3D format and the left-right view image independent 3D format.

Figure 2:
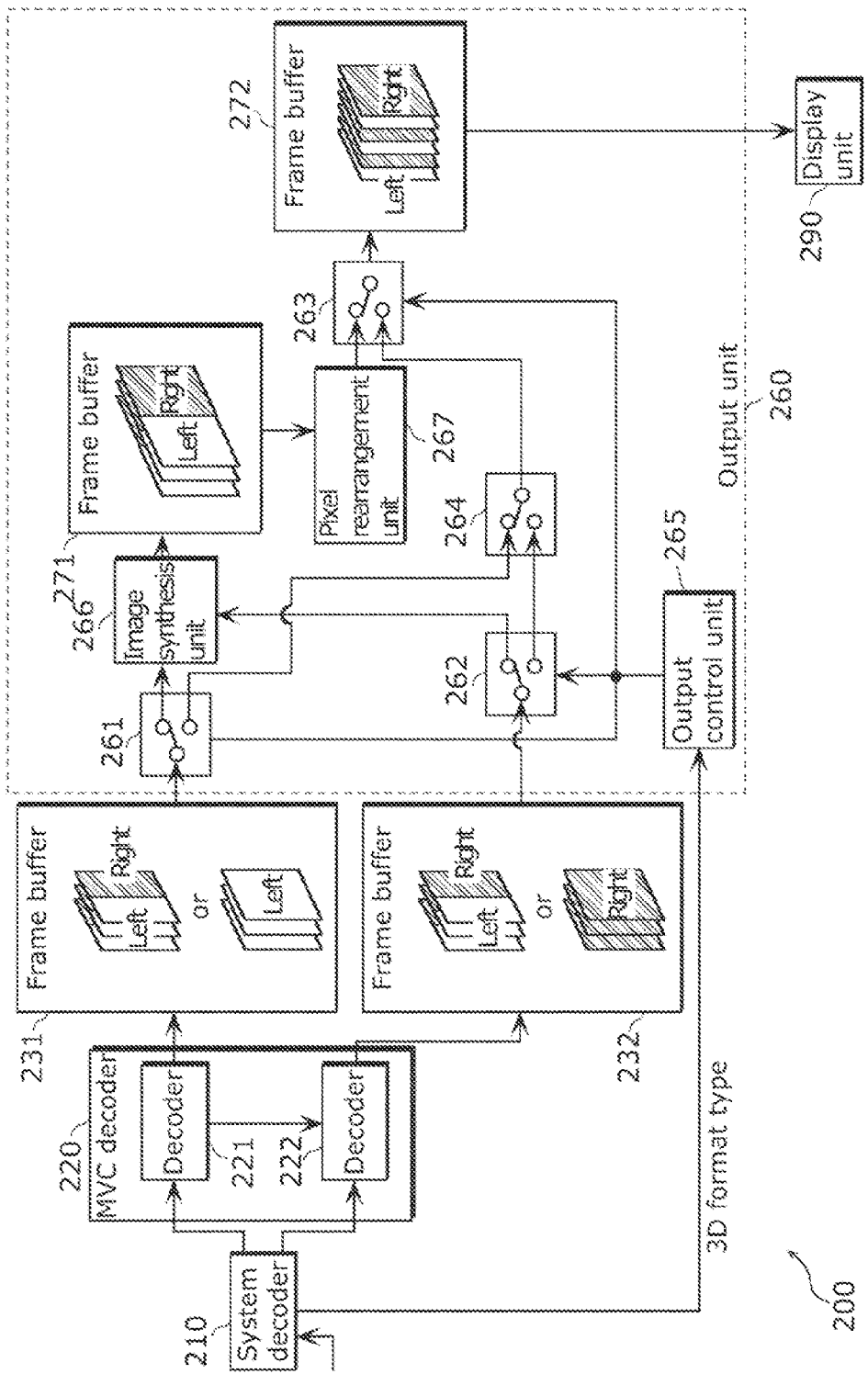
FIG. 2 is a block diagram showing an example of an image decoding apparatus according to Embodiment 1 of the present invention.

FIG. 2 is a block diagram showing an example of an image decoding apparatus according to this embodiment. An image decoding apparatus 200 shown in FIG. 2 includes a system decoder 210, an MVC decoder 220, two frame buffers 231 and 232, an output unit 260, and a display unit 290. The MVC decoder 220 includes two decoders 221 and 222. The output unit 260 includes four switches 261 to 264, an output control unit 265, an image synthesis unit 266, a pixel rearrangement unit 267, and two frame buffers 271 and 272.

The system decoder 210 executes system decoding on the system stream, to demultiplex the system stream into the 3D format type and the two coded bit streams.

For example, the system decoder 210 demultiplexes the system stream into the 3D format type and the two coded bit streams of the base layer and the enhancement layer. The decoder 221 in the MVC decoder 220 decodes the picture included in the base layer, and stores the decoded picture in the frame buffer 231. The decoder 222 in the MVC decoder 220 decodes the picture included in the enhancement layer, and stores the decoded picture in the frame buffer 232.

Alternatively, the system decoder 210 demultiplexes the system stream into the 3D format type and the two coded bit streams of the left view and the right view. The decoder 221 in the MVC decoder 220 decodes the picture included in the left view, and stores the decoded picture in the frame buffer 231. The decoder 222 in the MVC decoder 220 decodes the picture included in the right view, and stores the decoded picture in the frame buffer 232.

The output control unit 265 in the output unit 260 switches the three switches 261 to 263 according to the 3D format type, thereby controlling an output mode.

In detail, in the case where the 3D format type is the left-right view pixel mixed 3D format, the image synthesis unit 266 synthesizes the picture of the base layer and the picture of the enhancement layer, to generate a high-resolution SBS image. In the SBS image, the left view area is positioned on the left side, and the right view area is positioned on the right side. The image synthesis unit 266 stores the generated SBS image in the frame buffer 271.

The pixel rearrangement unit 267 executes rearrangement on the SBS image stored in the frame buffer 271. That is, the pixel rearrangement unit 267 separates the image of the left view and the image of the right view from the SBS image, and alternately arranges the image of the left view and the image of the right view as left and right frames.

In the case where the 3D format type is the left-right view image independent 3D format, the switch 264 alternately arranges left and right frames.

As mentioned above, the output unit 260 outputs the image decoded by the MVC decoder 220, in the output mode specified by the 3D format type. Here, the output unit 260 may store the image in the frame buffer 272, in order to output the image at a proper timing. The display unit 290 displays the image outputted from the output unit 260.

In this embodiment, the 3D format type is notified in the system layer from the coding side to the decoding side. This allows the image decoding apparatus 200 to recognize the difference in output mode associated with the difference in 3D format, before decoding in the video layer. Hence, the image decoding apparatus 200 can execute resource allocation and initialization in the output unit 260 beforehand, such as allocating a memory area for holding the high-resolution SBS image. As a result, a delay in image display can be reduced.

Besides, there is no need to notify the 3D format type from the MVC decoder 220 which is a video decoder to the output unit 260. This contributes to a simpler structure of the image decoding apparatus 200.

Figure 3:
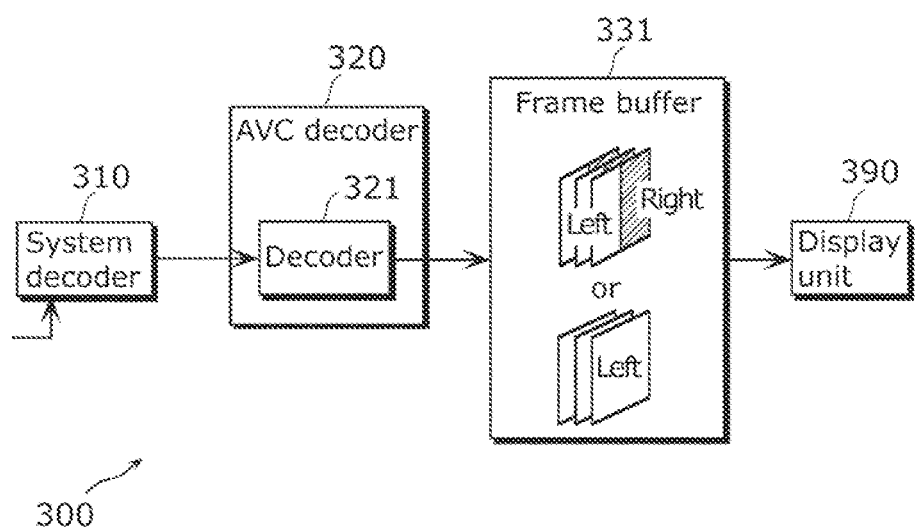
FIG. 3 is a block diagram showing another example of the image decoding apparatus according to Embodiment 1 of the present invention.

FIG. 3 is a block diagram showing another example of the image decoding apparatus according to this embodiment. An image decoding apparatus 300 shown in FIG. 3 includes a system decoder 310, an AVC decoder 320, a frame buffer 331, and a display unit 390. The image decoding apparatus 300 is an AVC-compliant reproduction apparatus.

The image decoding apparatus 300 is incapable of decoding the view (non-base view) other than the base view, in the system stream generated by the image coding apparatus 100 according to this embodiment. That is, the enhancement layer or the right view is not decoded. A decoder 321 in the AVC decoder 320 decodes only the base layer or the left view, and the display unit 390 displays only the as base layer or the left view.

Thus, the system stream generated by the image coding apparatus 100 according to this embodiment is backward-compatible with an AVC-compliant reproduction apparatus.

FIG. 4 is a schematic diagram showing an example of an image reduction method according to this embodiment. The image coding apparatus 100 shown in FIG. 1 reduces an input image to generate a SBS image. An image reduction method used for this reduction is shown in FIG. 4.

For example, a horizontal ½ reduction unit 411 in FIG. 4 corresponds to the horizontal ½ reduction unit 111 in FIG. 1, and a horizontal ½ reduction unit 413 in FIG. 4 corresponds to the horizontal ½ reduction unit 113 in FIG. 1. Alternatively, the horizontal ½ reduction unit 411 in FIG. 4 corresponds to the horizontal ½ reduction unit 112 in FIG. 1, and the horizontal ½ reduction unit 413 in FIG. 4 corresponds to the horizontal ½ reduction unit 114 in FIG. 1.

The image coding apparatus 100 divides the picture of each view into odd columns and even columns. In detail, the horizontal ½ reduction unit 411 samples only pixels of odd columns in the picture, and the horizontal ½ reduction unit 413 samples only pixels of even columns in the picture. As a result, an odd column image and an even column image are obtained.

The image coding apparatus 100 combines the odd column image obtained from one view and the odd column image obtained from the other view to generate a SBS image, and codes the generated SBS image as the base layer. The image coding apparatus 100 also combines the even column image obtained from one view and the even column image obtained from the other view to generate a SBS image, and codes the generated SBS image as the enhancement layer.

FIG. 5 is a schematic diagram showing an example of an image synthesis method according to this embodiment. An image synthesis unit 566 in FIG. 5 corresponds to the image synthesis unit 266 in FIG. 2.

The image decoding apparatus 200 decodes the base layer, to obtain the decoded picture of the base layer. The image decoding apparatus 200 then obtains the odd column image of the left view, from the left view image area in the decoded picture of the base layer. The image decoding apparatus 200 also decodes the enhancement layer, to obtain the decoded picture of the enhancement layer. The image decoding apparatus 200 then obtains the even column image of the left view, from the left view image area in the decoded picture of the enhancement layer.

The image synthesis unit 566 alternately synthesizes the odd column image and the even column image per pixel column. The image decoding apparatus 200 thus generates the picture of the left view at the original resolution.

Though the above describes the case where the image decoding apparatus 200 generates the picture of the left view, the image decoding apparatus 200 can generate the picture of the right view in the same manner. The image decoding apparatus 200 obtains the odd column image of the right view and the even column image of the right view, respectively from the right view image area in the base layer and the right view image area in the enhancement layer. The image synthesis unit 566 alternately synthesizes the odd column image and the even column image per pixel column. The image decoding apparatus 200 thus generates the picture of the right view at the original resolution.

An AVC-compliant reproduction apparatus capable of decoding only the base layer can decode the 3D image at low resolution, by decoding only the odd column image. This ensures backward compatibility. Meanwhile, an MVC-compliant reproduction apparatus capable of decoding both the base layer and the enhancement layer can reconstruct the 3D image at high resolution, by decoding the odd column image and the even column image.

Though this embodiment describes an example where SBS is used as the left-right view pixel mixed 3D format, the left-right view pixel mixed 3D format may instead be TAB (Top And Bottom) and the like. Reduction and synthesis can be realized by properly selecting the enlargement or reduction direction (e.g. horizontal or vertical) the pixel sampling method (e.g. interlaced scanning on rows or columns or lattice-like thinning) according to the difference in position of the left view image area and the right view image area.

Furthermore, the image coding apparatus 100 and the image decoding apparatus 200 may perform a noise reduction process such as lowpass filtering, after the reconstruction of the high-resolution 3D image. Higher image quality can be attained in this way.

FIG. 6 shows an example of an MVC descriptor according to this embodiment. A descriptor is data used in MPEG-2 Systems and the like. Attribute information of a coded bit stream, such as a frame rate, is included in the descriptor. The system stream according to this embodiment includes the MVC descriptor.

The MVC descriptor is a type of descriptor for a multi-view video coding scheme. The MVC descriptor therefore includes attribute information of a coded bit stream obtained by coding an image according to the multiview video coding scheme. The MVC descriptor is also referred to as an MVC extension descriptor.

A syntax of the MVC descriptor is described in NPL 2 (ISO/IEC 13818-1: 2007/Amd 4: 2009) or NPL 3 (Recommendation H.222.0 (2006) Amendment 4 (December 2009) "Transport of multiview video over ITU-T Rec. H.222.0 | ISO/IEC 13818-1").

In FIG. 6, frame_packing_info_present_flag is added as the 3D format type to the syntax described in the above-mentioned documents. Moreover, seven reserved bits are added so that the MVC descriptor has a size of an integral multiple of a byte.

For instance, the format of the image is the left-right view pixel mixed 3D format in the case where frame_packing_info_present_flag is 1, and the left-right view image independent 3D format (normal MVC stream) in the case where frame_packing_info_present_flag is 0.

Though frame_packing_info_present_flag is used here as an example of the 3D format type, the syntax name, the range of the value (0 and 1), and the meaning of the value are not limited to this example. Other forms of expression are also applicable so long as it is possible to notify whether or not the format of the image is the left-right view pixel mixed 3D format.

Though this embodiment describes an example where the 3D format type is inserted at the end of the MVC descriptor, the insertion position is not limited to such. The 3D format type may be inserted at another bit position in the MVC descriptor, or inserted in a descriptor other than the MVC descriptor.

FIG. 7 shows another example of the MVC descriptor according to this embodiment. In FIG. 7, four reserved bits in the syntax described in the above-mentioned documents are replaced with frame_packing_info_present_flag of one bit and three reserved bits. In this way, frame_packing_info_present_flag can be incorporated in the MVC descriptor while maintaining the total number of bits of the MVC descriptor.

As described above, the image coding apparatus 100 notifies the image decoding apparatus 200 in the system layer whether or not the format of the image is the left-right view pixel mixed 3D format.

This enables the image decoding apparatus 200 to smoothly switch the output mode. The image coding apparatus 100 and the image decoding apparatus 200 can therefore properly handle the 3D video format including the base layer and the enhancement layer.

[Embodiment 2]

Figure 8:
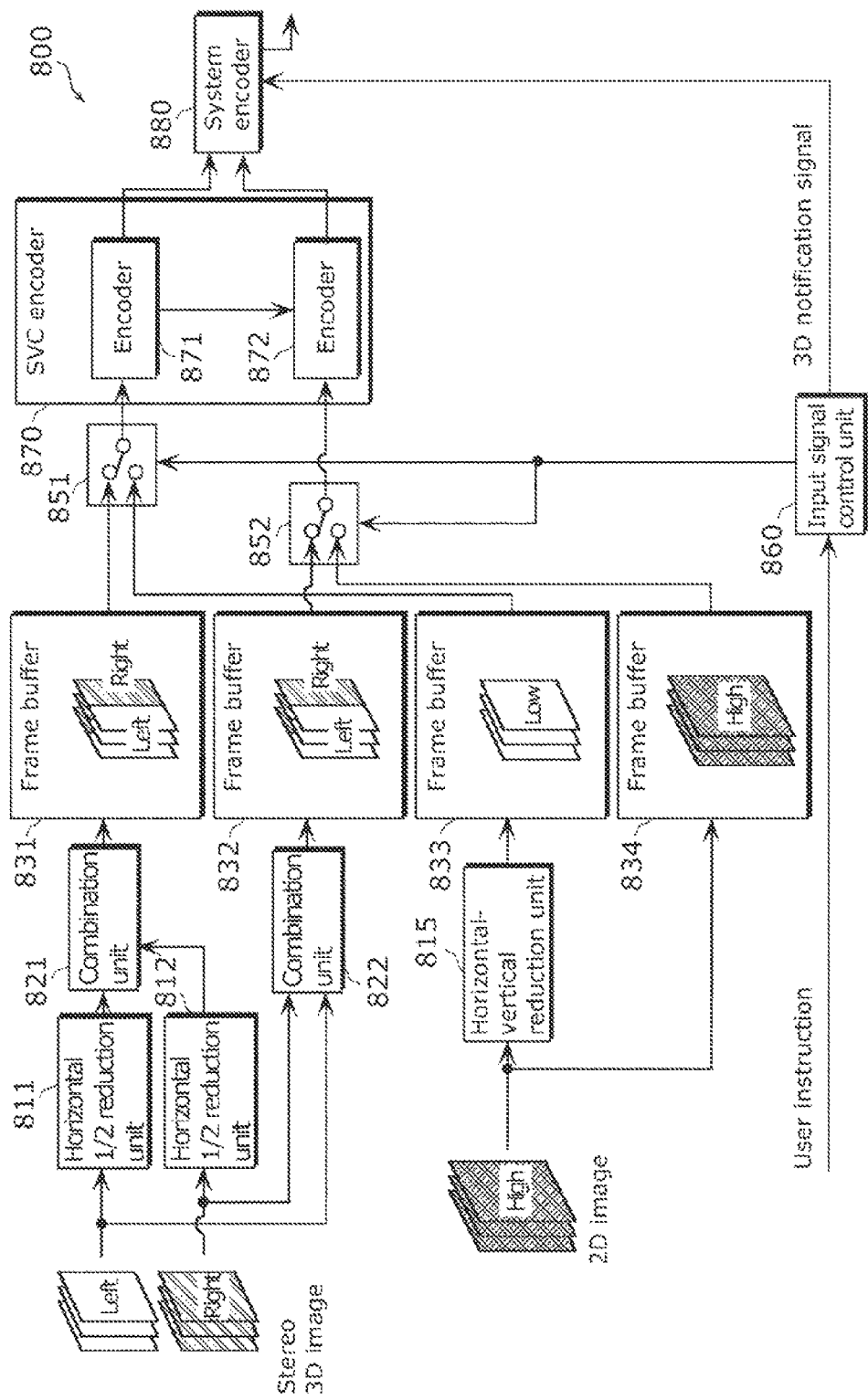
FIG. 8 is a block diagram showing an example of an image coding apparatus according to Embodiment 2 of the present invention.

FIG. 8 is a block diagram showing an example of an image coding apparatus according to Embodiment 2 of the present invention. An image coding apparatus 800 shown in FIG. 8 includes two horizontal ½ reduction units 811 and 812, a horizontal-vertical reduction unit 815, two combination units 821 and 822, four frame buffers 831 to 834, two switches 851 and 852, an input signal control unit 860, an SVC encoder 870, and a system encoder 880. The SVC encoder 870 includes two encoders 871 and 872.

The image coding apparatus 800 receives, as an input, a 3D image of the left-right view image independent 3D format or a 2D image.

In the case of coding the 3D image, the image coding apparatus 800 converts the 3D image of the left-right view image independent 3D format to a 3D image of the left-right view pixel mixed 3D format. After this, the image coding apparatus 800 further converts the 3D image of the left-right view pixel mixed 3D format to two pictures corresponding to two resolutions.

For example, the horizontal ½ reduction unit 811 reduces a picture of the left view by ½ in the horizontal direction. The horizontal ½ reduction unit 812 reduces a picture of the right view by ½ in the horizontal direction. The combination unit 821 combines the picture reduced by the horizontal ½ reduction unit 811 and the picture reduced by the horizontal ½ reduction unit 812. As a result, a SBS image is generated as a picture of a low-resolution layer (base layer). The combination unit 821 stores the picture of the low-resolution layer in the frame buffer 831.

The two horizontal ½ reduction units 811 and 812 and the combination unit 821 may execute the same process as the two horizontal ½ reduction units 111 and 112 and the combination unit 121 according to Embodiment 1. Alternatively, the two horizontal ½ reduction units 811 and 812 and the combination unit 821 may execute the same process as the two horizontal ½ reduction units 113 and 114 and the combination unit 122 according to Embodiment 1.

The combination unit 822 combines the picture of the left view and the picture of the right view, without reducing them. As a result, a SBS image is generated as a picture of a high-resolution layer (enhancement layer). The combination unit 822 stores the picture of the high-resolution layer in the frame buffer 832.

By the above-mentioned procedure, the image coding apparatus 800 converts the 3D image of the left-right view pixel mixed 3D format to the two pictures corresponding to the two resolutions.

In the case of coding the 2D image, on the other hand, the image coding apparatus 800 converts the 2D image to two pictures corresponding to two resolutions.

For example, the horizontal-vertical reduction unit 815 reduces the 2D image in the horizontal and vertical directions. As a result, a picture of the low-resolution layer is generated. The picture of the low-resolution layer is stored in the frame buffer 833. Meanwhile, the 2D image is directly stored in the frame buffer 834 as a picture of the high-resolution layer.

By the above-mentioned procedure, the image coding apparatus 800 converts the 2D image to the two pictures corresponding to the two resolutions.

The SVC encoder 870 converts the two pictures of the low-resolution layer and the high-resolution layer, to two coded bit streams of the low-resolution layer and the high-resolution layer.

For example, the encoder 871 in the SVC encoder 870 codes the picture stored in the frame buffer 831, and the encoder 872 in the SVC in encoder 870 codes the picture stored in the frame buffer 832.

Alternatively, the encoder 871 in the SVC encoder 870 codes the picture stored in the frame buffer 833, and the encoder 872 in the SVC encoder 870 codes the picture stored in the frame buffer 834.

Thus, the SVC encoder 870 converts the two pictures of the low-resolution layer and the high-resolution layer, to the two coded bit streams of the low-resolution layer and the high-resolution layer.

The input signal control unit 860 switches the two switches 851 and 852 according to an instruction from the user, thereby switching the pictures inputted to the SVC encoder 870.

For example, in the case where the user instructs the image coding apparatus 800 to code the 3D image, the pictures stored in the two frame buffers 831 and 832 are inputted to the SVC encoder 870. In the case where the user instructs the image coding apparatus 800 to code the 2D image, the pictures stored in the two frame buffers 833 and 834 are inputted to the SVC encoder 870.

The system encoder 880 executes system encoding on the two coded bit streams and a 3D notification signal, and outputs a system stream. The 3D notification signal indicates whether the format of the image is the left-right view pixel mixed 3D format or the 2D format.

Though this embodiment describes the case where the input signal control unit 860 switches the format of the image based on the user instruction, the format of the image to be coded may be fixed to one of the left-right view pixel mixed 3D format and the 2D format.

Figure 9:
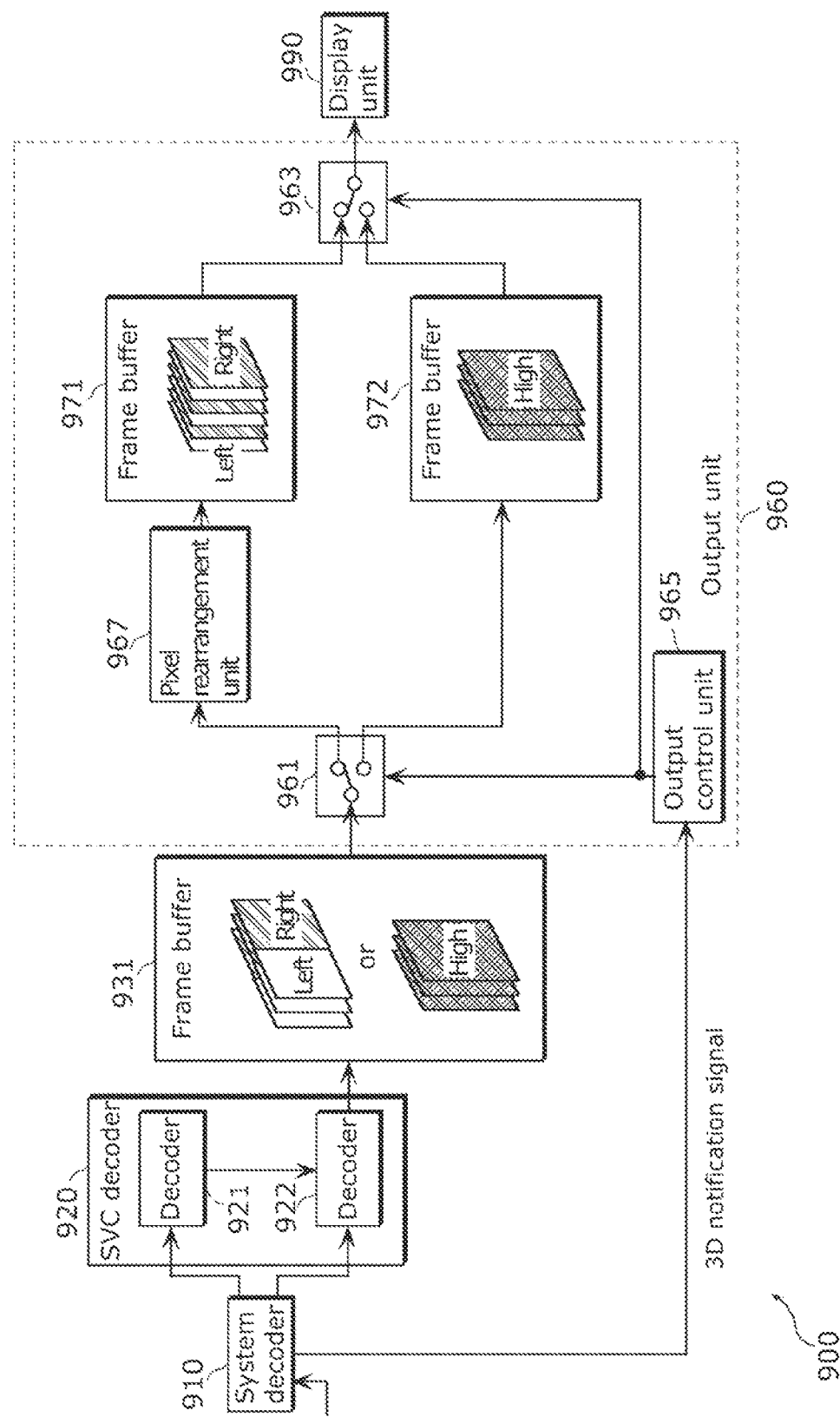
FIG. 9 is a block diagram showing an example of an image decoding apparatus according to Embodiment 2 of the present invention.

FIG. 9 is a block diagram showing an example of an image decoding apparatus according to this embodiment. An image decoding apparatus 900 shown in FIG. 9 includes a system decoder 910, an SVC decoder 920, a frame buffer 931, an output unit 960, and a display unit 990. The SVC decoder 920 includes two decoders 921 and 922. The output unit 960 includes two switches 961 and 963, an output control unit 965, a pixel rearrangement unit 967, and two frame buffers 971 and 972.

The system decoder 910 executes system decoding on the system stream, to demultiplex the system stream into the 3D notification signal and the two coded bit streams of the low-resolution layer and the high-resolution layer. The decoder 921 in the SVC decoder 920 decodes the picture included in the low-resolution layer. The decoder 922 in the SVC decoder 920 decodes the picture included in the high-resolution layer. Here, the decoder 922 may decode the picture of the high-resolution layer using the picture of the low-resolution layer.

The decoder 922 stores the decoded picture in the frame buffer 931. That is, the picture of the high-resolution layer is stored in the frame buffer 931.

The output control unit 965 in the output unit 960 switches the two switches 961 and 963 according to the 3D notification signal, thereby controlling an output mode.

In detail, in the case where the 3D notification signal indicates the left-right view pixel mixed 3D format, the pixel rearrangement unit 967 executes rearrangement. For instance, the pixel rearrangement unit 967 separates the image of the left view and the image of the right view from the SBS image of the high-resolution layer, and alternately arranges the image of the left view and the image of the right view as left and right frames. The output unit 960 outputs an image obtained as a result of the rearrangement.

In the case where the 3D notification signal indicates the 2D format, the output unit 960 directly outputs the 2D image of the high-resolution layer.

By the above-mentioned procedure, the output unit 960 outputs the image decoded by the SVC decoder 920, in the output mode specified by the 3D notification signal. Here, the output unit 960 may store the image in any of the two frame buffers 971 and 972, in order to output the image at a proper timing. The 3D image includes the picture of the left view and the picture of the right view.

In other words, the 3D image includes pictures twice as many as the 2D image. This being so, in the case of the 3D image, the output unit 960 executes the output process at high speed. The display unit 990 displays the image outputted from the output unit 960.

In this embodiment, the 3D notification signal is notified in the system layer from the coding side to the decoding side. This allows the image decoding apparatus 900 to recognize the difference in output mode associated with the difference in image format, before decoding in the video layer. Hence, the image decoding apparatus 900 can execute resource allocation and initialization in the output unit 960 beforehand, such as allocating a memory for holding the high-resolution SBS image or the high-resolution 2D image.

Besides, there is no need to notify the 3D notification signal from the SVC decoder 920 which is a video decoder to the output unit 960. This contributes to a simpler structure of the image decoding apparatus 900.

FIG. 10 is a block diagram showing another example of the image decoding apparatus according to this embodiment. An image decoding apparatus 1000 shown in FIG. 10 includes a system decoder 1010, an AVC decoder 1020, a frame buffer 1031, and a display unit 1090. The image decoding apparatus 1000 is an AVC-compliant reproduction apparatus.

The image decoding apparatus 1000 is incapable of decoding the layer other than the low-resolution layer, in the system stream generated by the image coding apparatus 800 according to this embodiment. That is, the high-resolution layer is not decoded. A decoder 1021 in the AVC decoder 1020 decodes only the low-resolution layer, and the display unit 1090 displays only the low-resolution layer. Thus, the system stream generated by the image coding apparatus 800 according to this embodiment is backward-compatible with an AVC-compliant reproduction apparatus.

Though this embodiment describes an example where SBS is used as the left-right view pixel mixed 3D format, the left-right view pixel mixed 3D format may instead be TAB (Top And Bottom) and the like. Reduction and synthesis can be realized by properly selecting the enlargement or reduction direction (e.g. horizontal or vertical) and the pixel sampling method (e.g. interlaced scanning on rows or columns or lattice-like thinning) according to the difference in position of the left view image area and the right view image area.

Furthermore, the image coding apparatus 800 and the image decoding apparatus 900 may perform a noise reduction process such as lowpass filtering, after the reconstruction of the high-resolution 3D image. Higher image quality can be attained in this way.

FIG. 11 shows an example of an SVC descriptor according to this embodiment. A descriptor is data used in MPEG-2 Systems and the like. Attribute information of a coded bit stream, such as a frame rate, is included in the descriptor. The system stream according to this embodiment includes the SVC descriptor.

The SVC descriptor is a type of descriptor for a scalable video coding scheme. The SVC descriptor therefore includes attribute information of a coded bit stream obtained by coding an image according to the scalable video coding scheme. The SVC descriptor is also referred to as an SVC extension descriptor.

A syntax of the SVC descriptor is described in NPL 4 (ISO/IEC 13818-1: 2007/Amd 3: 2009) or NPL 5 (Recommendation H.222.0 (2006) Amendment 3 (March 2009) "Transport of scalable video over ITU-T Rec. H.222.0 | ISO/IEC 13818-1").

In FIG. 11, frame_packing_info_present_flag is inserted as the 3D notification signal instead of a reserved bit, in the syntax described in the above-mentioned documents.

For instance, the format of the image is the left-right view pixel mixed 3D format in the case where frame_packing_info_present_flag is 1, and the 2D format (normal SVC stream) in the case where frame_packing_info_present_flag is 0.

Though frame_packing_info_present_flag is used here as an example of the 3D notification signal, the syntax name, the range of the value (0 and 1), and the meaning of the value are not limited to this example. Other forms of expression are also applicable so long as it is possible to notify whether or not the format of the image is the left-right view pixel mixed 3D format.

Though this embodiment describes an example where the 3D notification signal is inserted at the end of the SVC descriptor, the insertion position is not limited to such. The 3D notification signal may be inserted at another bit position in the SVC descriptor, or inserted in a descriptor other than the SVC descriptor.

In addition to the last one reserved bit, the SVC descriptor also contains five reserved bits as the ninth item. For example, these five reserved bits may be replaced with frame_packing_info_present_flag of one bit and four reserved bits.

As described above, the image coding apparatus 800 notifies the image decoding apparatus 900 in the system layer whether or not the format of the image is the left-right view pixel mixed 3D format. This enables the image decoding apparatus 900 to smoothly switch the output mode. The image coding apparatus 800 and the image decoding apparatus 900 can therefore properly handle the 3D video format including the base layer and the enhancement layer.

[Embodiment 3]

Embodiment 3 of the present invention describes a system layer compliant with MPEG-2 Systems, which is applicable to the image coding apparatus and the image decoding apparatus according to each of Embodiments 1 and 2.

Figure 12:
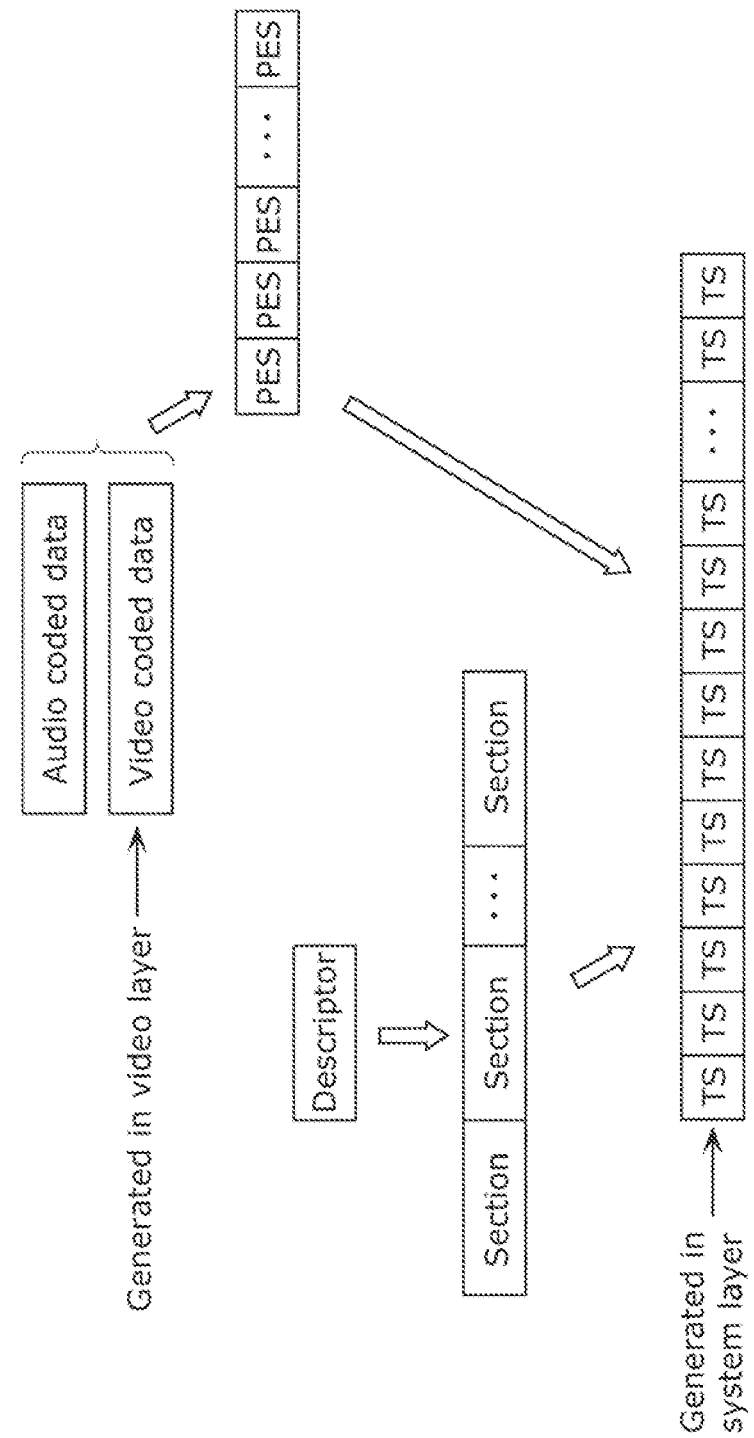
FIG. 12 is a diagram showing a system stream of MPEG-2 Systems according to Embodiment 3 of the present invention.

FIG. 12 is a diagram showing a system stream of MPEG-2 Systems according to this embodiment. The system stream shown in FIG. 12 is composed of TS (Transport Stream) packets. The system encoder 180 in Embodiment 1 and the system encoder 880 in Embodiment 2 may each generate the system stream composed of the TS packets shown in FIG. 12. The following describes a structure of the system stream in detail.

The MVC encoder 170 in Embodiment 1 and the SVC encoder 870 in Embodiment 2 each generate video coded data in the video layer. The video coded data generated in the video layer is stored in PES (Packetized Elementary Stream) packets.

Here, video coded data corresponding to one picture may be stored in one PES packet or in a plurality of PES packets. Moreover, video coded data corresponding to a plurality of pictures may be stored in one PES packet. Furthermore, audio coded data may be stored in PES packets. PES packets are then divided into a plurality of TS packets of a fixed length.

Meanwhile, a descriptor is stored in a section. A section is one of the data structures used in MPEG-2 Systems. Sections are divided into a plurality of TS packets of the fixed length, as with PES packets.

TS packets corresponding to PES packets and TS packets corresponding to sections are multiplexed as the system stream. In detail, TS packets corresponding to sections are periodically inserted between TS packets corresponding to PES packets. Note that intervals at which TS packets are periodically inserted are not limited to regular intervals.

There is an instance where a plurality of descriptors are stored in the system stream. These descriptors have two types, namely, a descriptor indicating attributes of audio and video and a descriptor indicating attributes of a program that contains audio and video. The MVC descriptor and the SVC descriptor are each a descriptor indicating attributes of audio and video. The format information in each of Embodiments 1 and 2 may be stored in a descriptor indicating attributes of a program.

The system layer in each of Embodiments 1 and 2 may be compliant with MPEG-2 Systems. That is, the system stream generated in the system layer may include a coded stream and a descriptor.

[Embodiment 4]

Embodiment 4 of the present invention describes a system layer compliant with MP4, which is applicable to the image coding apparatus and the image decoding apparatus according to each of Embodiments 1 and 2.

Figure 13:
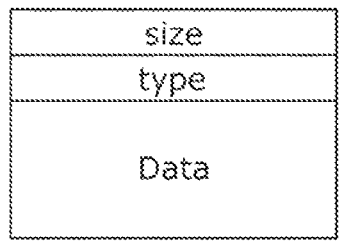
FIG. 13 is a diagram showing an example of a structure of a box in MP4 according to Embodiment 4 of the present invention.

FIG. 13 is a diagram showing an example of a structure of a box in MP4 according to this embodiment. A MP4 file is composed of boxes. For example, a box has a size, a type, and data, as shown in FIG. 13. The size indicates a size of the entire box. The type is an identifier of the box, and is expressed by four alphabet characters. The box may further include version information and flag information. Boxes are hierarchically stored in a MP4 file.

Figure 14:
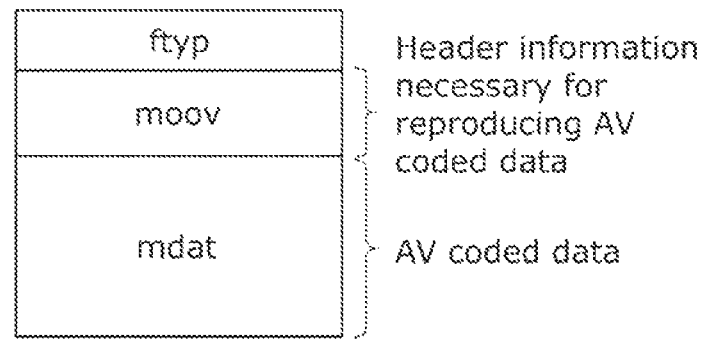
FIG. 14 is a diagram showing an example of a structure of a MP4 file according to Embodiment 4 of the present invention.

FIG. 14 is a diagram showing an example of a structure of a MP4 file according to this embodiment. In the example shown in FIG. 14, the MP4 file is composed of a box whose type is ftyp, a box whose type is moov, and a box whose type is mdat (hereafter simply referred to as ftyp, moov, and mdat, respectively). ftyp, moov, and mdat are top-level boxes in a hierarchical structure of a plurality of boxes in the MP4 file.

Not only a frame reproduction time and address information in the MP4 file but also attribute information of video or audio in the MP4 file is stored in moov. In other words, head information necessary for reproducing AV coded data (audio coded data and video coded data) is stored in moov. The AV coded data stored in mdat.

The system encoder 180 in Embodiment 1 and the system encoder 880 in Embodiment 2 may each generate such a MP4 file. The format information in each of Embodiments 1 and 2 may be stored in moov, as attributes of video coded data. In more detail, the format information may be stored in a box in moov.

Figure 15:
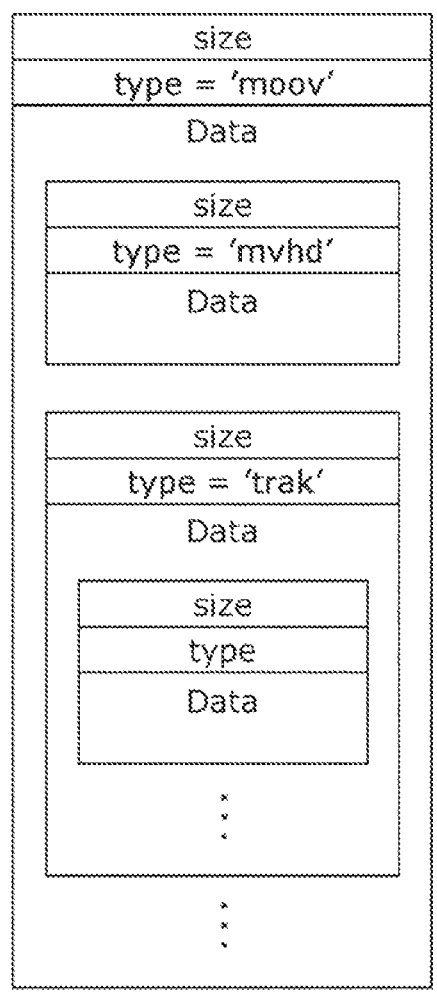
FIG. 15 is a diagram showing a box hierarchical structure according to Embodiment 4 of the present invention.

FIG. 15 is a diagram showing a box hierarchical structure according to this embodiment. FIG. 15 shows moov. A plurality of boxes are further contained in a data area in moov. Thus, a plurality of boxes are hierarchically arranged in the MP4 file. This enables various information to be stored in the MP4 file.

Figure 16:
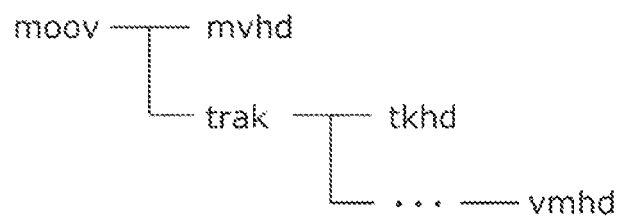
FIG. 16 is a diagram showing an example of header information according to Embodiment 4 of the present invention.

FIG. 16 is a diagram showing an example of header information according to this embodiment. FIG. 16 shows a plurality of boxes included in moov. For example, moov includes a box whose type is tkhd (Track Header Box) (hereafter simply referred to as tkhd), and a box whose type is vmhd (Video Media Header Box) (hereafter simply referred to as vmhd).

Top-level header information corresponding to a track is stored in tkhd. The track corresponds to one set of AV coded data of video or audio. In the case where the track is video coded data, header information of the video coded data is stored in vmhd.

The format information in each of Embodiments 1 and 2 may be stored in a reserved area in tkhd or vmhd. Alternatively, the format information may be stored in graphicsmode which is a field included in vmhd. A list of values indicating a video structure is defined in graphicsmode. A value indicating the left-right view pixel mixed 3D format may be added to this defined list.

It is possible to add a new box to the MP4 file. Hence, a new box for storing the format information in each of Embodiments 1 and 2 may be added to the MP4 file.

The system layer in each of Embodiments 1 and 2 may be compliant with MP4. That is, the system stream generated in the system layer may include a box containing format information and a is box containing a coded stream. In this case, the image coding apparatus and the image decoding apparatus in each of Embodiments 1 and 2 need not use the MVC descriptor or the SVC descriptor.

[Embodiment 5]

An image coding apparatus and an image decoding apparatus according to Embodiment 5 of the present invention include main components of the image coding apparatus and the image decoding apparatus described in the above embodiments.

Figure 17:
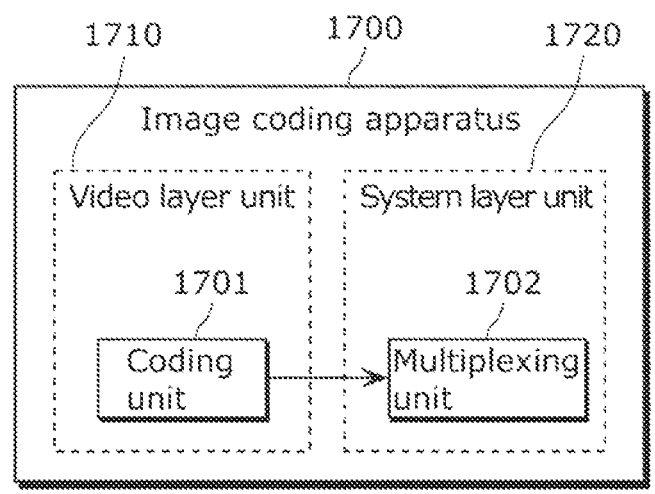
FIG. 17 is a block diagram showing an example of an image coding apparatus according to Embodiment 5 of the present invention.

FIG. 17 is a block diagram showing an example of the image coding apparatus according to this embodiment. An image coding apparatus 1700 shown in FIG. 17 includes a video layer unit 1710 and a system layer unit 1720. The video layer unit 1710 generates a coded stream by coding an image composed of one or more pictures. The system layer unit 1720 generates a system stream for transmitting or storing the coded stream.

The video layer unit 1710 includes a coding unit 1701. The system layer unit 1720 includes a Multiplexing unit 1702.

Figure 18:
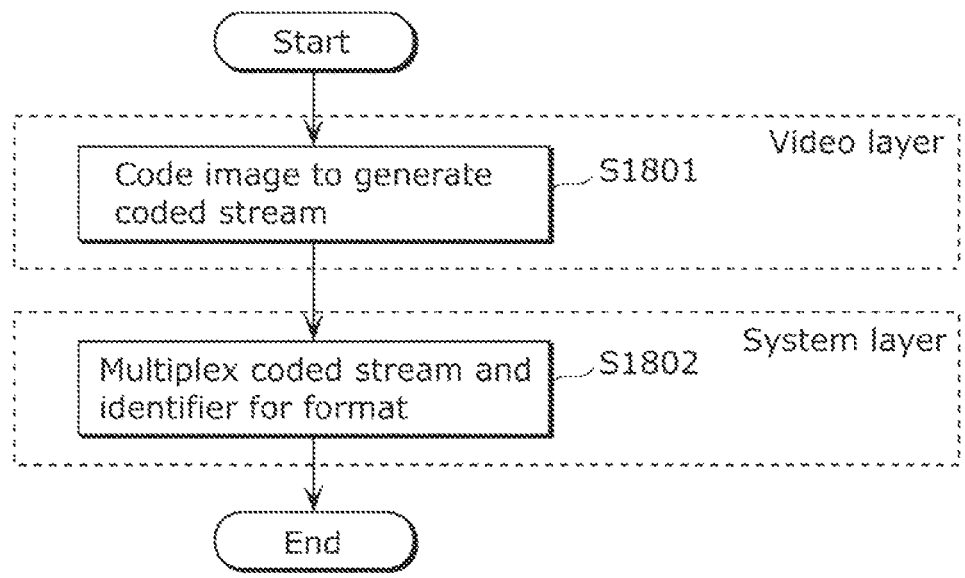
FIG. 18 is a flowchart showing an example of an operation of the image coding apparatus according to Embodiment 5 of the present invention.

FIG. 18 is a flowchart showing an example of an operation of the image coding apparatus 1700 shown in FIG. 17.

First, the coding unit 1701 codes the image to generate the coded stream (Step S1801). Here, in the case where the format of the image is the left-right mixed format, the coding unit 1701 codes the image that includes the base layer and the enhancement layer and that has the left view image area and the right view image area in each picture.

Next, the multiplexing unit 1702 multiplexes the coded stream and an identifier, to generate the system stream (Step S1802). The identifier indicates whether or not the format of the image is the left-right mixed format. The left-right mixed format is a format that includes the base layer and the enhancement layer for providing a plurality of degrees of accuracy, and that has the left view image area and the right view image area in each picture. The coded stream is the coded stream generated by the coding unit 1701.

Thus, the image coding apparatus 1700 can generate the system stream that enables determination in the system layer on the decoding side whether or not the image has the left-right mixed format. The image coding apparatus 1700 can therefore properly handle the 3D video format including the base layer and the enhancement layer.

Note that the video layer unit 1710 and the coding unit 1701 correspond to the MVC encoder 170 and the two encoders 171 and 172 according to Embodiment 1, and correspond to the SVC encoder 870 and the two encoders 871 and 872 according to Embodiment 2.

Hence, the video layer unit 1710 and the coding unit 1701 may execute the same process as the MVC encoder 170 and the two encoders 171 and 172 according to Embodiment 1, and may execute the same process as the SVC encoder 870 and the two encoders 871 and 872 according to Embodiment 2.

In addition, the system layer unit 1720 and the multiplexing unit 1702 correspond to the system encoder 180 according to Embodiment 1, and correspond to the system encoder 880 according to Embodiment 2. Hence, the system layer unit 1720 and the multiplexing unit 1702 may execute the same process as the system encoder 180 according to Embodiment 1, and may execute the same process as the system encoder 880 according to Embodiment 2.

Moreover, the system layer unit 1720 (system layer) may be compliant with MPEG-2 Systems. That is, the multiplexing unit 1702 in the system layer unit 1720 may generate the system stream including the coded stream and the descriptor.

Moreover, the video layer unit 1710 (video layer) may be compliant with the multiview video coding scheme. That is, the coding unit 1701 in the video layer unit 1710 may code the image according to the multiview video coding scheme to generate the coded stream. In more detail, the coding unit 1701 may code the base layer as the base view and the enhancement layer as the non-base view and, in when coding the enhancement layer as the non-base view, reference to the base layer as the base view.

In the case where the system layer unit 1720 is compliant with MPEG-2 Systems and the video layer unit 1710 is compliant with the multiview video coding scheme, the multiplexing unit 1702 may insert the identifier in the descriptor for the multiview video coding scheme, and multiplex the coded stream and the descriptor that includes the identifier, to generate the system stream.

Thus, the image is coded according to the multiview video coding scheme, and the identifier is inserted in the descriptor for the multiview video coding scheme. The image coding apparatus 1700 can therefore generate the proper system stream using the descriptor.

Moreover, the video layer unit 1710 (video layer) may be compliant with H.264 MVC which is a standard of the multiview video coding scheme. That is, the coding unit 1701 in the video layer unit 1710 may code the image according to H.264 MVC to generate the coded stream.

In the case where the system layer unit 1720 is compliant with MPEG-2 Systems and the video layer unit 1710 is compliant with H.264 MVC, the multiplexing unit 1702 may insert the identifier in the MVC descriptor for H.264 MVC, and multiplex the coded stream and the MVC descriptor that includes the identifier, to generate the system stream.

Thus, the image is coded according to H.264 MVC, and the identifier is inserted in the MVC descriptor for H.264 MVC. The image coding apparatus 1700 can therefore generate the proper system stream using the MVC descriptor.

Though H.264 MVC is a typical example of the multiview video coding scheme, the video layer unit 1710 (video layer) may be compliant with a standard other than H.264 MVC. For example, the video layer unit 1710 may be compliant with a successor to H.264 MVC. There is a likelihood that the multiview video coding scheme is defined in HEVC (High Efficiency Video Coding) which is a successor to H.264. The video layer unit 1710 may be compliant with the multiview video coding scheme of HEVC.

Moreover, the coding unit 1701 may code the image of the left-right mixed format in the case where the format of the image is the left-right mixed format, and code the image of the left-right independent format in the case where the format of the image is not the left-right mixed format. The left-right independent format is a format that includes the picture of the left view and the picture of the right view as separate pictures.

Thus, the image coding apparatus 1700 can code the image of the left-right mixed format or the image of the left-right independent format.

Moreover, the video layer unit 1710 (video layer) may be compliant with the scalable video coding scheme. That is, the coding unit 1701 in the video layer unit 1710 may code the image according to the scalable video coding scheme to generate the coded stream. In more detail, the coding unit 1701 may code the image including the base layer and the enhancement layer.

In the case where the system layer unit 1720 is compliant with MPEG-2 Systems and the video layer unit 1710 is compliant with the scalable video coding scheme, the multiplexing unit 1702 may insert the identifier in the descriptor for the scalable video coding scheme, and multiplex the coded stream and the descriptor that includes the identifier, to generate the system stream.

Thus, the image is coded according to the scalable video coding scheme, and the identifier is inserted in the descriptor for the scalable video coding scheme. The image coding apparatus 1700 can therefore generate the proper system stream using the descriptor.

Moreover, the video layer unit 1710 (video layer) may be compliant with H.264 SVC which is a standard of the scalable video coding scheme. That is, the coding unit 1701 in the video layer unit 1710 may code the image according to H.264 SVC to generate the coded stream.

In the case where the system layer unit 1720 is compliant with MPEG-2 Systems and the video layer unit 1710 is compliant with H.264 SVC, the multiplexing unit 1702 may insert the identifier in the SVC descriptor for H.264 SVC, and multiplex the coded stream and the SVC descriptor that includes the identifier, to generate the system stream.

Thus, the image is coded according to H.264 SVC, and the identifier is inserted in the SVC descriptor for H.264 SVC. The image coding apparatus 1700 can therefore generate the proper system stream using the SVC descriptor.

Though H.264 SVC is a typical example of the scalable video coding scheme, the video layer unit 1710 (video layer) may be compliant with a standard other than H.264 SVC. For example, the video layer unit 1710 may be compliant with a successor to H.264 SVC. There is a likelihood that the scalable video coding scheme is defined in HEVC which is a successor to H.264. The video layer unit 1710 may be compliant with the scalable video coding scheme of HEVC.

Moreover, the coding unit 1701 may code the image for stereoscopic display in the case where the format of the image is the left-right mixed format, and code the image for monoscopic display in the case where the format of the image is not the left-right mixed format.

Thus, the image coding method according to the present invention can code the image for stereoscopic display or the image for monoscopic display.

Moreover, the image, such as the image of the left-right mixed format, inputted to the image coding apparatus 1700 may be generated by a separate, independent image generation apparatus. That is, the image coding apparatus 1700 need not have a function of generating such an image.

Figure 19:
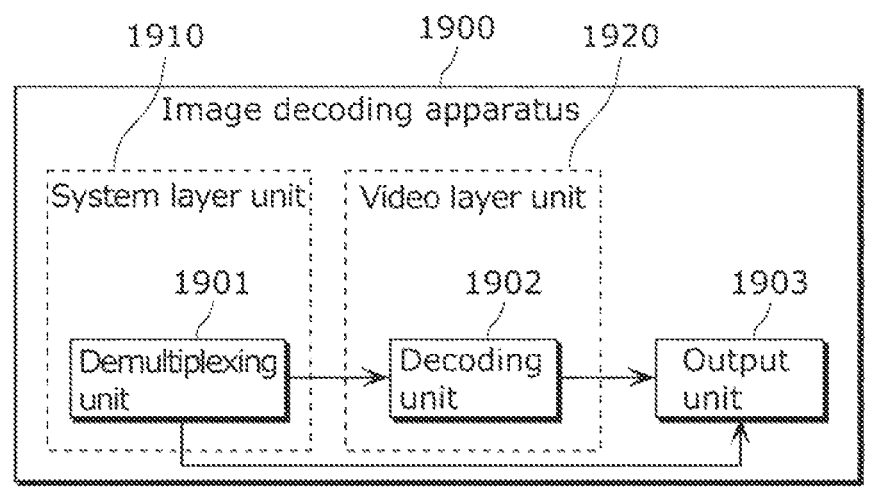
FIG. 19 is a block diagram showing an example of an image decoding apparatus according to Embodiment 5 of the present invention.

FIG. 19 is a block diagram showing an example of the image decoding apparatus according to this embodiment. An image decoding apparatus 1900 shown in FIG. 19 includes a system layer unit 1910, a video layer unit 1920, and an output unit 1903.

The system layer unit 1910 obtains the coded stream from the system stream for transmitting or storing the coded stream. The coded stream includes the image composed of one or more pictures. The video layer unit 1920 decodes the image in the coded stream.

The system layer unit 1910 includes a demultiplexing unit 1901. The video layer unit 1920 includes a decoding unit 1902.

Figure 20:
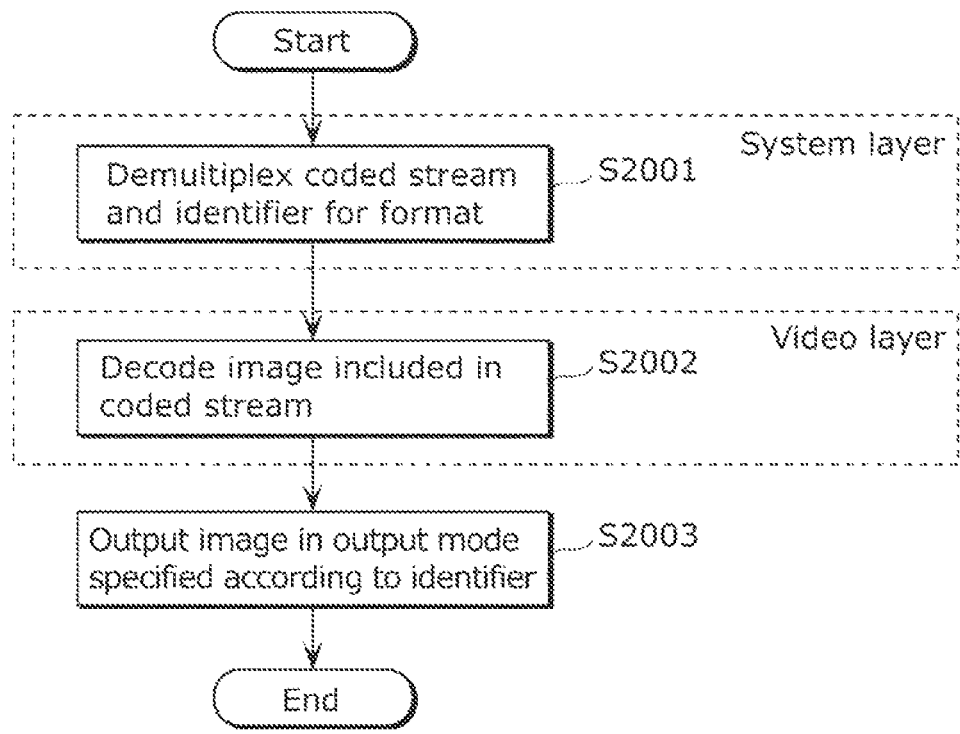
FIG. 20 is a flowchart showing an example of an operation of the image decoding apparatus according to Embodiment 5 of the present invention.

FIG. 20 is a flowchart showing an example of an operation of the image decoding apparatus 1900 shown in FIG. 19.

First, the demultiplexing unit 1901 demultiplexes the system stream into the coded stream and the identifier, to obtain the coded stream and the identifier (Step S2001). The identifier indicates whether or not the format of the image is the left-right mixed format. The left-right mixed format is a format that includes the base layer and the enhancement layer for providing a plurality of degrees of accuracy, and that has the left view image area and the right view image area in each picture.

Next, the decoding unit 1902 decodes the image included in the coded stream obtained by the demultiplexing unit 1901 (Step S2002). Here, in the case where the format of the image is the left-right mixed format, the decoding unit 1902 decodes the image that includes the base layer and the enhancement layer and that has the left view image area and the right view image area each picture.

Following this, the output unit 1903 outputs the image decoded by the decoding unit 1902, in an output mode specified according to the identifier obtained by the demultiplexing unit 1901 (Step S2003). The output mode includes not only an output image format but also an output image formation method and process.

Thus, the image decoding apparatus 1900 can switch the output mode of the image according to the identifier indicating whether or not the image has the left-right mixed format. The image decoding apparatus 1900 can therefore properly handle the 3D video format including the base layer and the enhancement layer.

Note that the system layer unit 1910 and the demultiplexing unit 1901 correspond to the system decoder 210 according to Embodiment 1, and correspond to the system decoder 910 according to Embodiment 2. Hence, the system layer unit 1910 and the demultiplexing unit 1901 may execute the same process as the system decoder 210 according to Embodiment 1, and may execute the same process as the system decoder 910 according to Embodiment 2.

In addition, the video layer unit 1920 and the decoding unit 1902 correspond to the MVC decoder 220 and the two decoders 221 and 222 according to Embodiment 1, and correspond to the SVC decoder 920 and the two decoders 921 and 922 according to Embodiment 2.

Hence, the video layer unit 1920 and the decoding unit 1902 may execute the same process as the MVC decoder 220 and the two decoders 221 and 222 according to Embodiment 1, and may execute the same process as the SVC decoder 920 and the two decoders 921 and 922 according to Embodiment 2.

Further, the output unit 1903 corresponds to the output unit 260 according to Embodiment 1, and corresponds to the output unit 960 according to Embodiment 2. Hence, the output unit 1903 may execute the same process as the output unit 260 according to Embodiment 1, and may execute the same process as the output unit 960 according to Embodiment 2.

Moreover, the system layer unit 1910 (system layer) may be compliant with MPEG-2 Systems. That is, the demultiplexing unit 1901 in the system layer unit 1910 may demultiplex the system stream into the coded stream and the descriptor.

Moreover, the video layer unit 1920 (video layer) may be compliant with the multiview video coding scheme. That is, the decoding unit 1902 in the video layer unit 1920 may decode the image coded according to the multiview video coding scheme. In more detail, the decoding unit 1902 may decode the base layer as the base view and the enhancement layer as the non-base view and, when decoding the enhancement layer as the non-base view, reference to the base layer as the base view.

In the case where the system layer unit 1910 is compliant with MPEG-2 Systems and the video layer unit 1920 is compliant with the multiview video coding scheme, the demultiplexing unit 1901 may demultiplex the system stream into the coded stream and the descriptor for the multiview video coding scheme, to obtain the coded stream and the identifier included in the descriptor.

Thus, the image decoding apparatus 1900 can decode the image coded according to the multiview video coding scheme, and obtain the identifier from the descriptor for the multiview video coding scheme. The image decoding apparatus 1900 can therefore properly handle the left-right mixed format.

Moreover, the video layer unit 1920 (video layer) may be compliant with H.264 MVC. That is, the decoding unit 1902 in the video layer unit 1920 may decode the image coded according to H.264 MVC.

In the case where the system layer unit 1910 is compliant with MPEG-2 Systems and the video layer unit 1920 is compliant with H.264 MVC, the demultiplexing unit 1901 may demultiplex the system stream into the coded stream and the MVC descriptor for H.264 MVC, to obtain the coded stream and the identifier included in the MVC descriptor.

Thus, the image decoding apparatus 1900 can decode the image coded according to H.264 MVC, and obtain the identifier from the MVC descriptor for H.264 MVC. The image decoding apparatus 1900 can therefore properly handle the left-right mixed format.

Moreover, the decoding unit 1902 may decode the image of the left-right mixed format in the case where the format of the image is the left-right mixed format, and decode the image of the left-right independent format in the case where the format of the image is not the left-right mixed format. The left-right independent format is a format that includes the picture of the left view and the picture of the right view as separate pictures.

Thus, the image decoding apparatus 1900 can decode the image of the left-right mixed format or the image of the left-right independent format.

Moreover, the video layer unit 1920 (video layer) may be compliant with the scalable video coding scheme. That is, the decoding unit 1902 in the video layer unit 1920 may decode the image coded according to the scalable video coding scheme. In more detail, the decoding unit 1902 may decode the image including the base layer and the enhancement layer.

In the case where the system layer unit 1910 is compliant with MPEG-2 Systems and the video layer unit 1920 is compliant with the scalable video coding scheme, the demultiplexing unit 1901 may demultiplex the system stream into the coded stream and the descriptor for the scalable video coding scheme, to obtain the coded stream and the identifier included in the descriptor.

Thus, the image decoding apparatus 1900 can decode the image coded according to the scalable video coding scheme, and obtain the identifier from the descriptor for the scalable video coding scheme. The image decoding apparatus 1900 can therefore properly handle the left-right mixed format.

Moreover, the video layer unit 1920 (video layer) may be compliant with H.264 SVC. That is, the decoding unit 1902 in the video layer unit 1920 may decode the image coded according to H.264 SVC.

In the case where the system layer unit 1910 is compliant with MPEG-2 Systems and the video layer unit 1920 is compliant with H.264 SVC, the demultiplexing unit 1901 may demultiplex the system stream into the coded stream and the SVC descriptor for H.264 SVC, to obtain the coded stream and the identifier included in the SVC descriptor.

Thus, the image decoding apparatus 1900 can decode the image coded according to H.264 SVC, and obtain the identifier from the SVC descriptor for H.264 SVC. The image decoding apparatus 1900 can therefore properly handle the left-right mixed format.

Moreover, the decoding unit 1902 may decode the image for stereoscopic display in the case where the format of the image is the left-right mixed format, and decode the image for monoscopic display in the case where the format of the image is not the left-right mixed format.

Thus, the image decoding apparatus 1900 can decode the image for stereoscopic display or the image for monoscopic display.

[Embodiment 6]

An image coding apparatus and an image decoding apparatus according to Embodiment 6 of the present invention include additional components to the image coding apparatus and the image decoding apparatus according to Embodiment 5.

Figure 21:
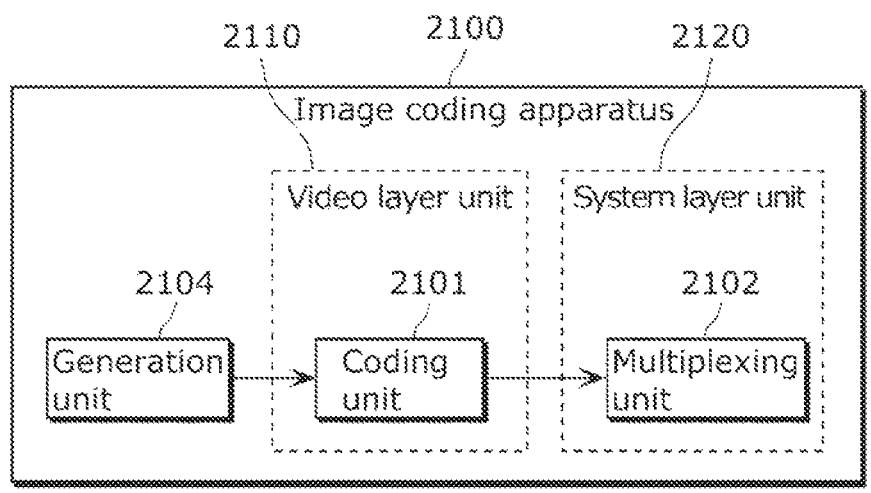
FIG. 21 is a block diagram showing an example of an image coding apparatus according to Embodiment 6 of the present invention.

FIG. 21 is a block diagram showing an example of the image coding apparatus according to this embodiment. An image coding apparatus 2100 shown in FIG. 21 includes a generation unit 2104, a video layer unit 2110, and a system layer unit 2120. The video layer unit 2110 includes a coding unit 2101. The system layer unit 2120 includes a multiplexing unit 2102.

The video layer unit 2110, the system layer unit 2120, the coding unit 2101, and the multiplexing unit 2102 respectively correspond to and operate in the same way as the video layer unit 1710, the system layer unit 1720, the coding unit 1701, and the multiplexing unit 1702 according to Embodiment 5.

The generation unit 2104 generates the image of the left-right mixed format, from a left picture and a right picture. The left picture is the picture of the left view. The right picture is the picture of the right view. When coding the image of the left-right mixed format, the coding unit 2101 codes the image generated by the generation unit 2104, to generate the coded stream.

Figure 22:
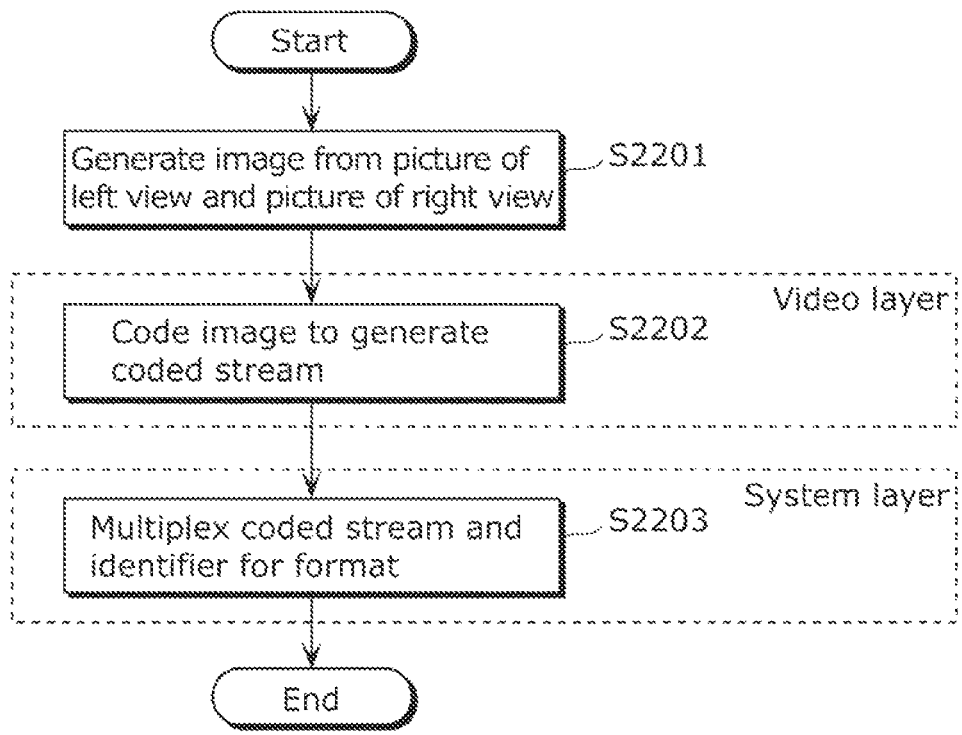
FIG. 22 is a flowchart showing an example of an operation of the image coding apparatus according to Embodiment 6 of the present invention.

FIG. 22 is a flowchart showing an example of an operation of the image coding apparatus 2100 shown in FIG. 21.

First, the generation unit 2104 generates the image of the left-right mixed format, from the left picture and the right picture (Step S2201).

In detail, the generation unit 2104 generates, as the picture of the base layer, a picture in which a first portion of the left picture is included in the left view image area and a second portion of the right picture is included in the right view image area. The generation unit 2104 also generates, as the picture of the enhancement layer, a picture in which a third portion of the left picture is included in the left view image area and a fourth portion of the right picture is included in the right view image area. Here, the third portion is different from the first portion, and the fourth portion is different from the second portion.

Alternatively, the generation unit 2104 generates, as the picture of the base layer, a picture in which a first portion of the left picture is included in the left view image area and a second portion of the right picture is included in the right view image area. The generation unit 2104 also generates, as the picture of the enhancement layer, a picture in which the whole left picture or a third portion of the left picture is included in the left view image area and the whole right picture or a fourth portion of the right picture is included in the right view image area. Here, the third portion includes the first portion, and the fourth portion includes the second portion.

By the above-mentioned procedure, the generation unit 2104 generates the image of the left-right mixed format from the left picture and the right picture.

Next, the coding unit 2101 codes the image to generate the coded stream (Step S2202). The coding unit 2101 codes the image generated by the generation unit 2104 to generate the coded stream, when coding the image of the left-right mixed format.

Following this, the multiplexing unit 2102 multiplexes the coded stream and the identifier, to generate the system stream (Step S2203). The identifier indicates whether or not the format of the image is the left-right mixed format.

Thus, the image coding apparatus 2100 can generate the image of the left-right mixed format. The image coding apparatus 2100 can therefore generate the system stream that enables determination in the system layer on the decoding side whether or not the image has the left-right mixed format.

The picture of the enhancement layer is generated from the portion different from the portion that corresponds to the picture of the base layer, or from the portion including the portion that corresponds to the picture of the base layer. Such picture of the base layer and picture of the enhancement layer achieve graduated accuracy.

Note that the generation unit 2104 corresponds to the four horizontal ½ reduction units 111 to 114 and the two combination units 121 and 122 according to Embodiment 1, and corresponds to the two horizontal ½ reduction units 811 and 812 and the two combination units 821 and 822 according to Embodiment 2.

Hence, the generation unit 2104 may execute the same process as the four horizontal ½ reduction units 111 to 114 and the two combination units 121 and 122 according to Embodiment 1, and may execute the same process as the two horizontal ½ reduction units 811 and 812 and the two combination units 821 and 822 according to Embodiment 2.

Figure 23:
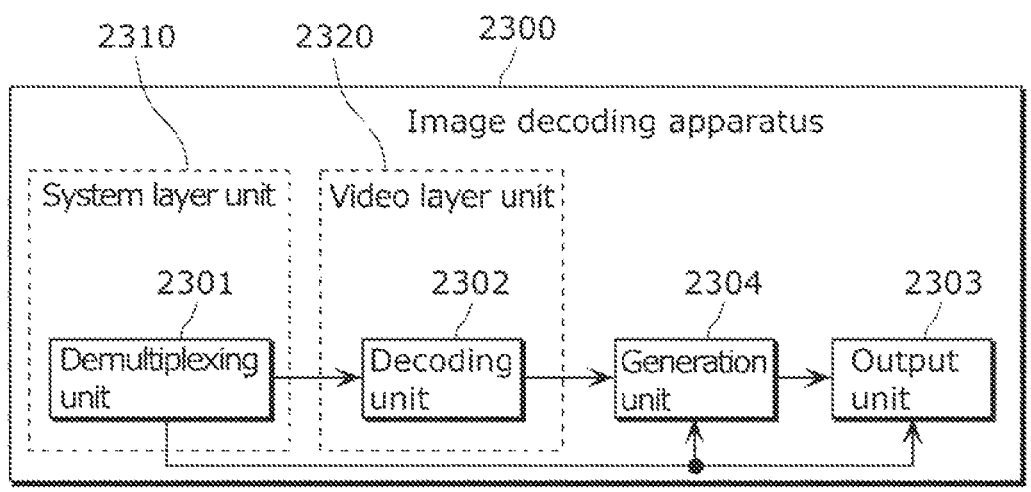
FIG. 23 is a block diagram showing an example of an image decoding apparatus according to Embodiment 6 of the present invention.

FIG. 23 is a block diagram showing an example of the image decoding apparatus according to this embodiment. An image decoding apparatus 2300 shown in FIG. 23 includes a system layer unit 2310, a video layer unit 2320, a generation unit 2304, and an output unit 2303. The system layer unit 2310 includes a demultiplexing unit 2301. The video layer unit 2320 includes a decoding unit 2302.

The system layer unit 2310, the video layer unit 2320, the demultiplexing unit 2301, and the decoding unit 2302 respectively correspond to and operate in the same way as the system layer unit 1910, the video layer unit 1920, the demultiplexing unit 1901, and the decoding unit 1902 according to Embodiment 5.

The generation unit 2304 generates a left picture and a right picture, in the case where the format of the image is the left-right mixed format. The left picture is the picture of the left view. The right picture is the picture of the right view. The output unit 2303 outputs, as the image, the left picture and the right picture generated by the generation unit 2304, in the case where the format of the image is the left-right mixed format.

Figure 24:
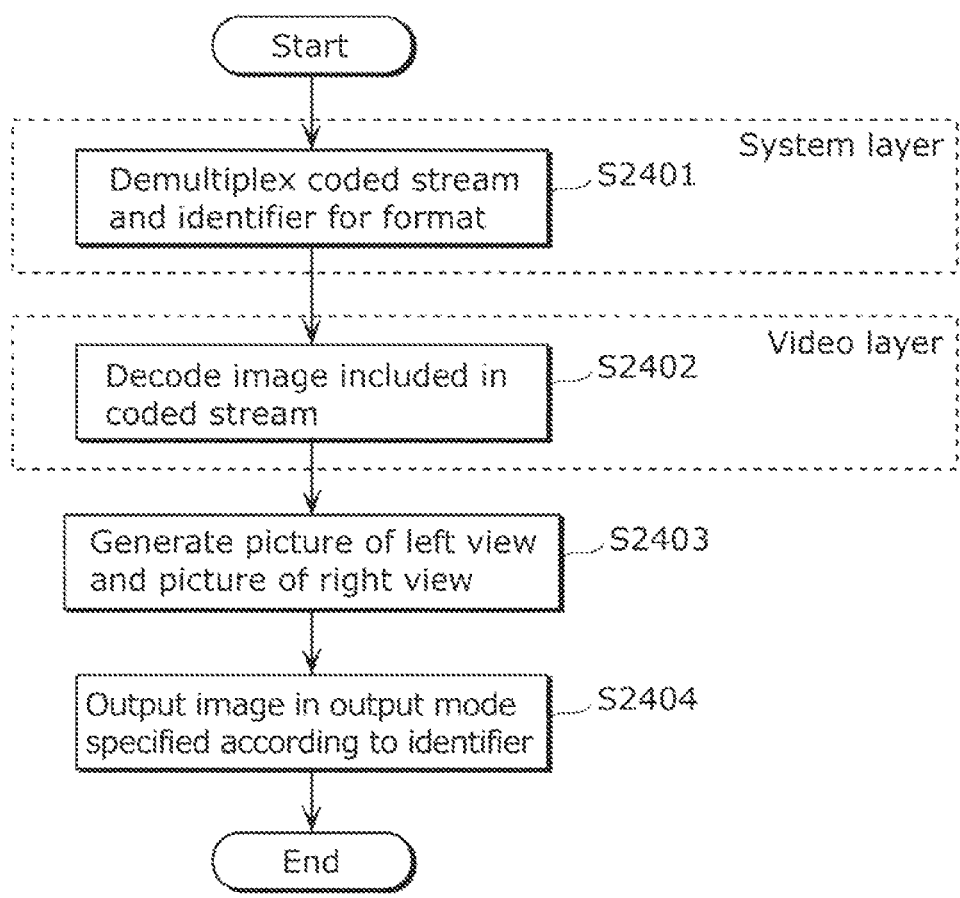
FIG. 24 is a flowchart showing an example of an operation of the image decoding apparatus according to Embodiment 6 of the present invention.

FIG. 24 is a flowchart showing an example of an operation of the image decoding apparatus 2300 shown in FIG. 23.

First, the demultiplexing unit 2301 demultiplexes the system stream into the coded stream and the identifier, to obtain the coded stream and the identifier (Step S2401). The identifier indicates whether or not the format of the image is the left-right mixed format.

Next, the decoding unit 2302 decodes the image included in the coded stream obtained by the demultiplexing unit 2301 (Step S2402).

Following this, the generation unit 2304 generates the left picture and the right picture, in the case where the format of the image is the left-right mixed format (Step S2403).

In detail, the generation unit 2304 obtains a first portion of the left picture from the left view image area in a base layer picture, and obtains a second portion of the right picture from the right view image area in the base layer picture. The base layer picture is the picture of the base layer, and is included in the image decoded by the decoding unit 2302.

The generation unit 2304 also obtains a third portion of the left picture from the left view image area in an enhancement layer picture, and obtains a fourth portion of the right picture from the right view image area in the enhancement layer picture. The enhancement layer picture is the picture of the enhancement layer, and is included in the image decoded by the decoding unit 2302. The third portion is different from the first portion, and the fourth portion is different from the second portion.

The generation unit 2304 then generates the left picture from the obtained first portion and the obtained third portion, and generates the right picture from the obtained second portion and the obtained fourth portion.

The output unit 2303 outputs the image decoded by the decoding unit 2302, in an output mode specified according to the identifier obtained by the demultiplexing unit 2301 (Step S2404). The output unit 2303 outputs, as the image, the left picture and the right picture generated by the generation unit 2304, in the case where the format of the image is the left-right mixed format.

Thus, the image decoding apparatus 2300 can switch the output mode of the image according to the identifier indicating whether or not the image has the left-right mixed format. The image decoding apparatus 2300 can also generate the high-resolution left picture and the high-resolution right picture, by combining the picture of the base layer and the picture of the enhancement layer.

Note that the generation unit 2304 corresponds to the image synthesis unit 266 and the pixel rearrangement unit 267 according to Embodiment 1. Hence, the generation unit 2304 may execute the same process as the image synthesis unit 266 and the pixel rearrangement unit 267 according to Embodiment 1.

Moreover, the generation unit 2304 may generate, in the case where the format of the image is the left-right mixed format, the left picture from the left view image area in a decoded picture and the right picture from the right view image area in the decoded picture. The decoded picture is a picture of one of the base layer and the enhancement layer, and is included in the image decoded by the decoding unit 2302.

Thus, the image decoding apparatus 2300 can generate the left picture and the right picture from any of the picture of the base layer and the picture of the enhancement layer. The image decoding apparatus 2300 can therefore generate the image having any of the plurality of degrees of accuracy.

In this case, the generation unit 2304 corresponds to the pixel rearrangement unit 967 according to Embodiment 2. Hence, the generation unit 2304 may execute the same process as the pixel rearrangement unit 967 according to Embodiment 2.

Though the image coding apparatus and the image decoding apparatus according to the present invention have been described by way of the embodiments, the present invention is not limited to these embodiments. Other embodiments realized by application of modifications conceivable by those skilled in the art to the embodiments and any combination of the components in the embodiments are also included in the present invention.

For example, a process executed by a specific processing unit may be executed by another processing unit. Moreover, a process execution sequence may be changed, or a plurality of processes may be executed in parallel.

Though the above describes the case where the enhancement layer is composed of a picture in the left-right mixed format, the enhancement layer need not be composed of a picture, and may be any data for improving the accuracy of the picture of the base layer. The accuracy is not limited to a resolution, and may be a frame rate, the number of pixels, a pixel depth, a signal to noise ratio, or the like.

The present invention can be realized not only as the image coding apparatus and the image decoding apparatus, but also as methods including steps corresponding to the processing units included in the image coding apparatus and the image decoding apparatus. For example, these steps are executed by a computer.

The present invention can also be realized as a program for causing the computer to execute the steps included in such methods. The present invention can further be realized as a computer-readable recording medium such as a CD-ROM on which the program is recorded.

The components included in the image coding apparatus and the image decoding apparatus may be realized by LSI (Large Scale Integration) which is an integrated circuit. The components may each be individually implemented as one chip, or may be partly or wholly implemented on one chip. As an example, the components other than the storage unit may be implemented as one chip. Though LSI is mentioned here, the integrated circuit may be called an IC (Integrated Circuit), system LSI, super LSI, ultra LSI, or the like, depending on the degree of integration.

The integrated circuit method is not limited to LSI, and may be realized by a dedicated circuit or a general-purpose processor. A FPGA (Field Programmable Gate Array) which can be programmed or a reconfigurable processor which is capable of reconfiguring connections and settings of circuit cells in LSI may also be used.

When an integrated circuit technology that replaces LSI emerges from development of semiconductor technologies or other derivative technologies, such a technology may be used to create integrated circuits of the components included in the image coding apparatus and the image decoding apparatus.

[Embodiment 7]

The processing described in each of Embodiments can be simply implemented in an independent computer system, by recording, in a recording medium, a program for implementing the configurations of the moving picture coding method and the moving picture decoding method described in each of Embodiments. The recording media may be any recording media as long as the program can be recorded, such as a magnetic disk, an optical disk, a magnetic optical disk, an IC card, and a semiconductor memory.

Hereinafter, the applications to the moving picture coding method and the moving picture decoding method described in each of Embodiments and systems using them will be described.

Figure 25:
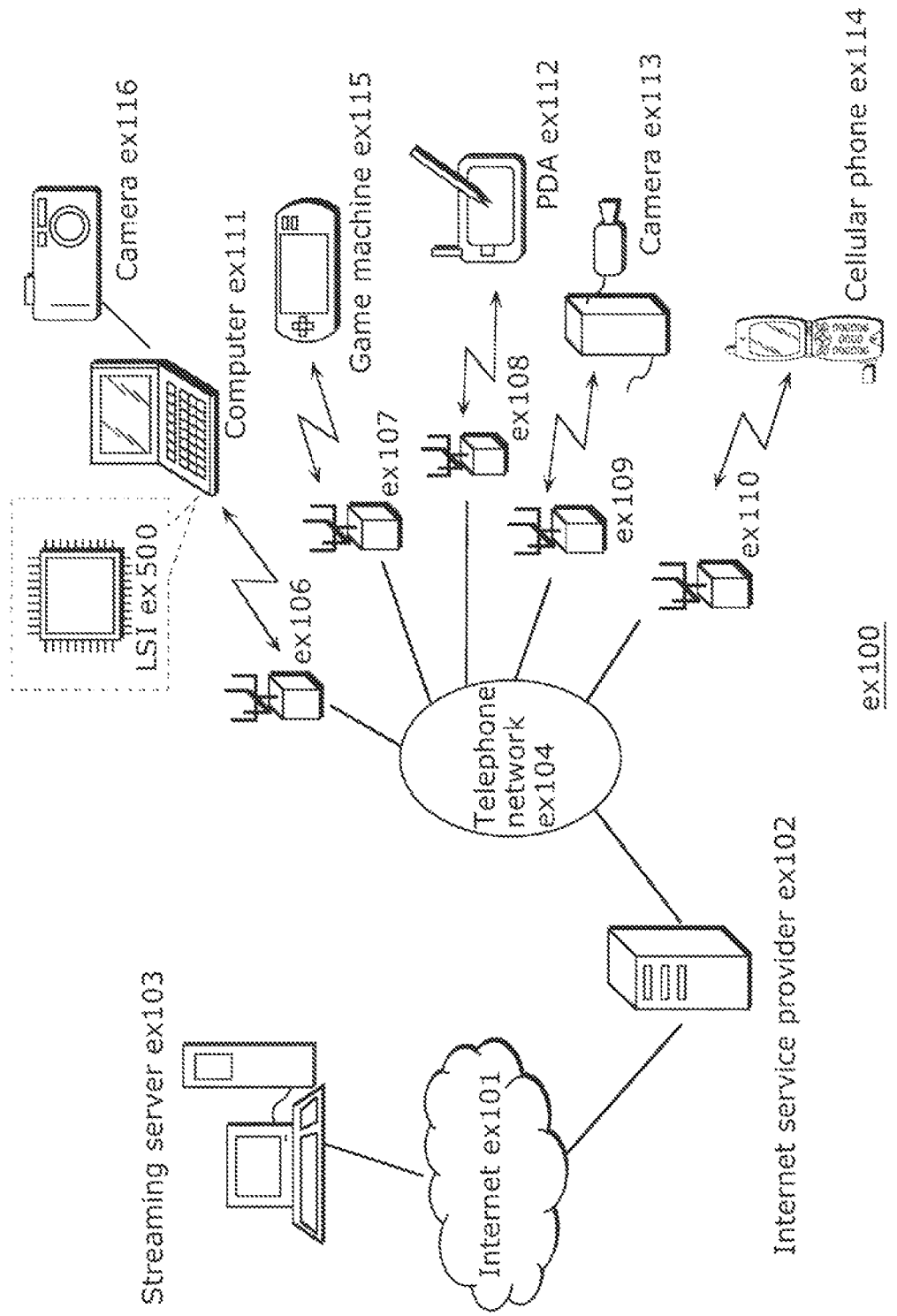
FIG. 25 illustrates an overall configuration of a content providing system for implementing content distribution services.

FIG. 25 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 25, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of Embodiments, and the coded content is transmitted to the streaming server ex103.

On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video so captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 26:
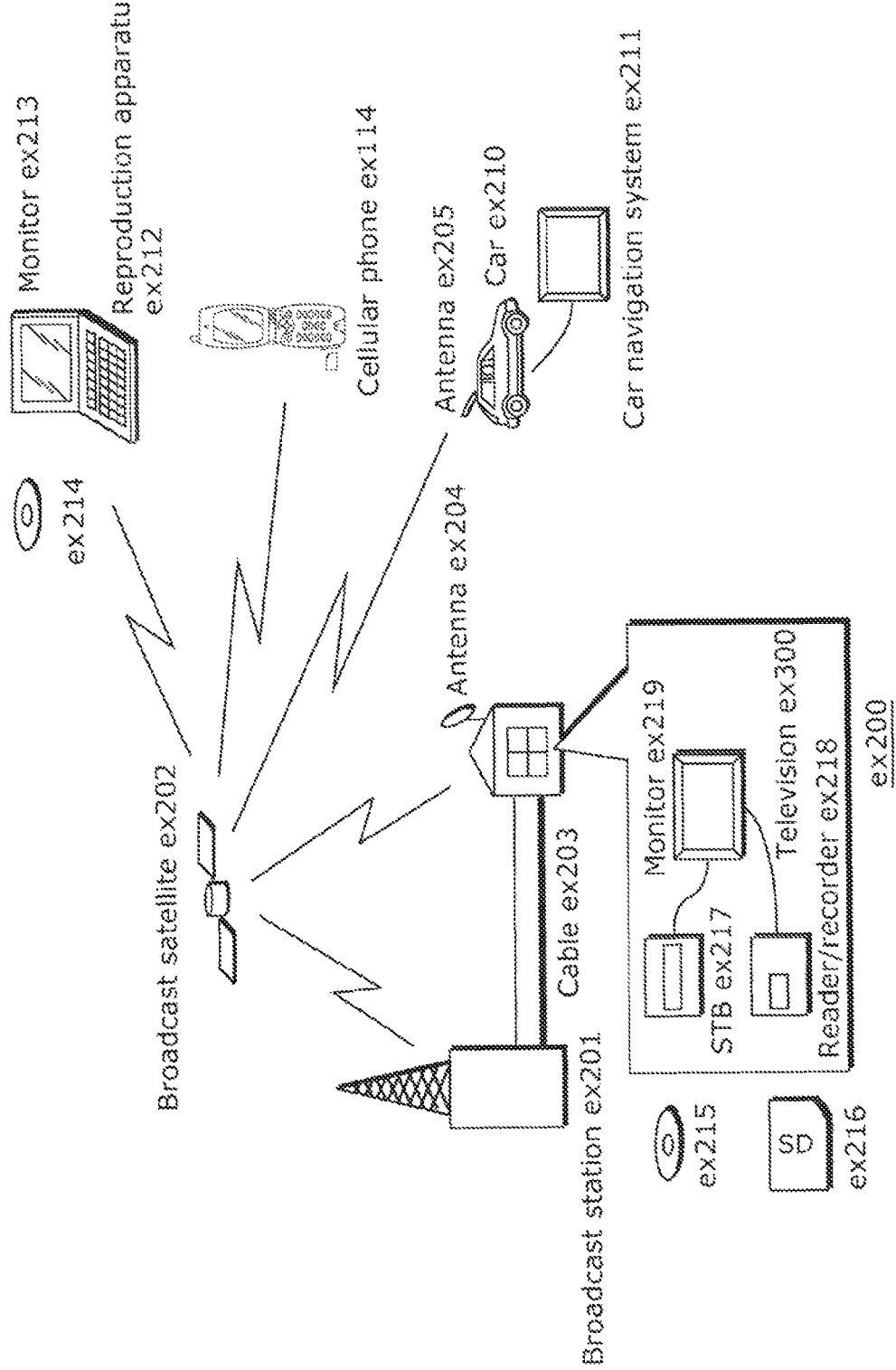
FIG. 26 illustrates an overall configuration of a digital broadcasting system.

Aside from the example of the content providing system ex100, at least one of the moving picture coding apparatus and the moving picture decoding apparatus described in each of Embodiments may be implemented in a digital broadcasting system ex200 illustrated in FIG. 26. More specifically, a broadcast station ex201 communicates or transmits, via radio waves to a broadcast satellite ex202, multiplexed data obtained by multiplexing audio data and others onto video data. The video data is data coded by the moving picture coding method described in each of Embodiments. Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data.

Furthermore, a reader/recorder ex218 (i) reads and decodes the multiplexed data recorded on a recording media ex215, such as a DVD and a BD, or (ii) codes video signals in the recording medium ex215, and in some cases, writes data obtained by multiplexing an audio signal on the coded data. The reader/recorder ex218 can include the moving picture decoding apparatus or the moving picture coding apparatus as shown in each of Embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 27:
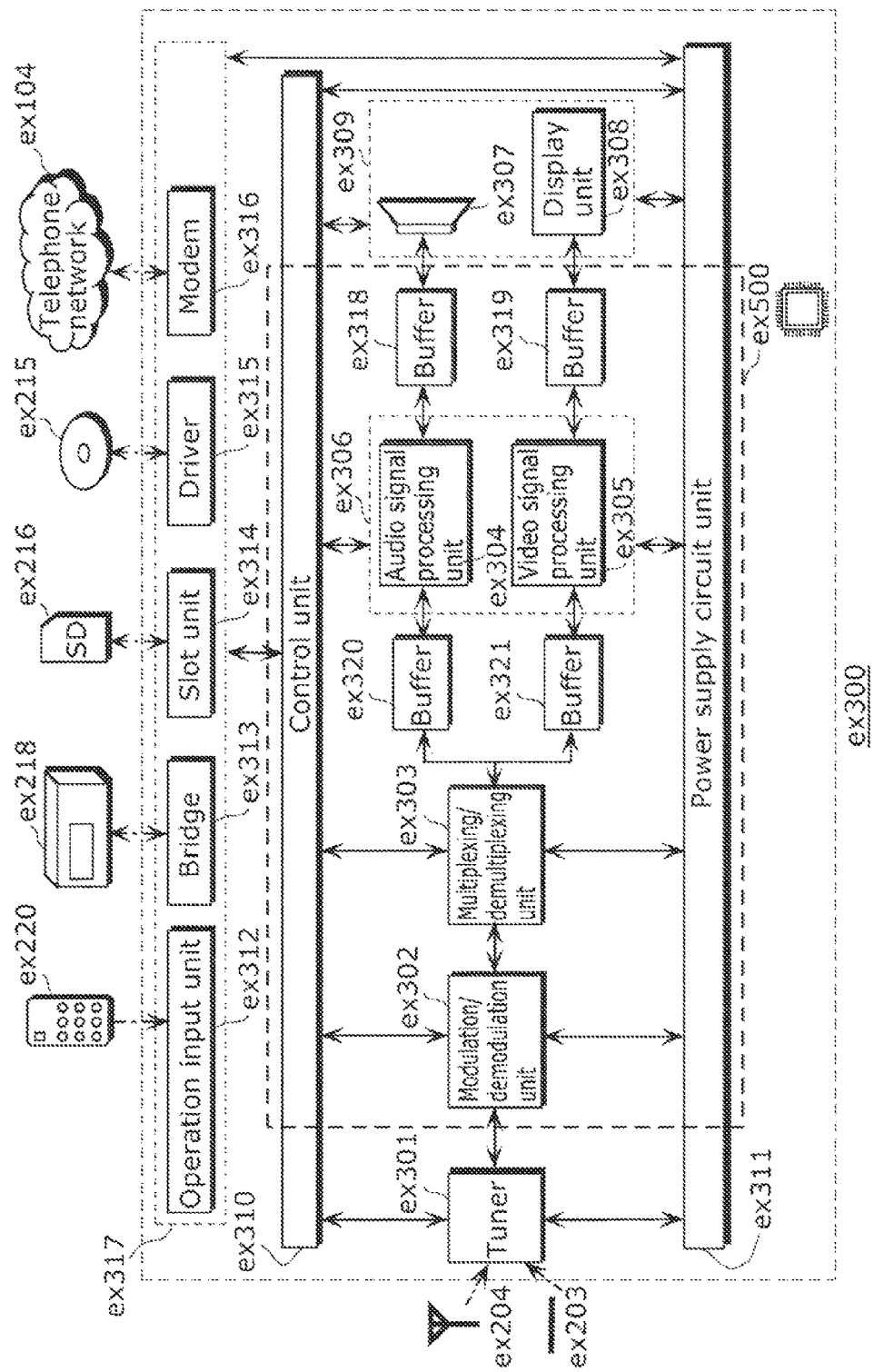
FIG. 27 is a block diagram illustrating an example of a configuration of a television.

FIG. 27 illustrates the television (receiver) ex300 that uses the moving picture coding method and the moving picture decoding method described in each of Embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively; and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of Embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of Embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, although not illustrate, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 28:
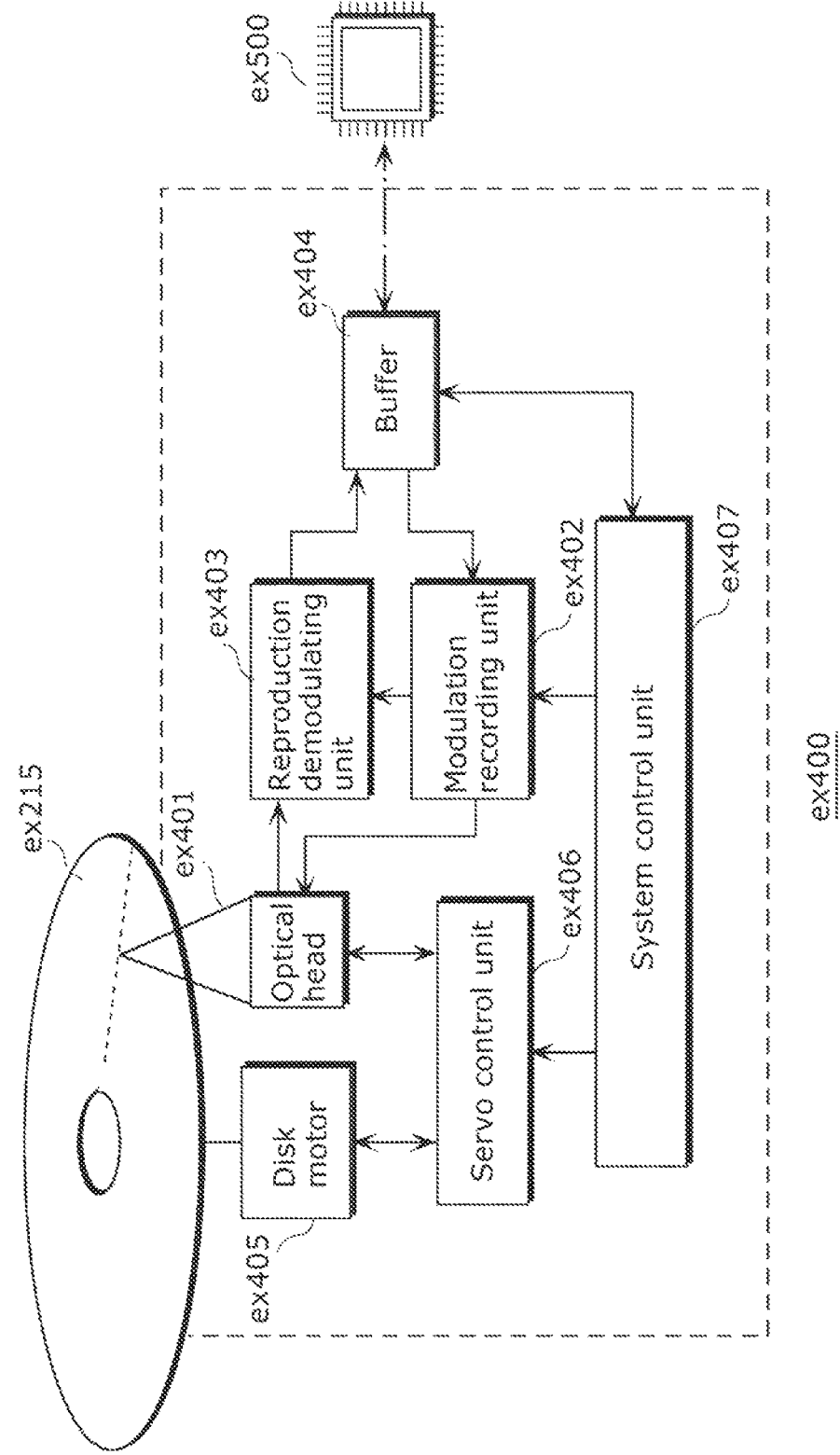
FIG. 28 is a block diagram illustrating an example of a configuration of an information reproducing/recording unit that reads and writes information from or on a recording medium that is an optical disk.

As an example, FIG. 28 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 29:
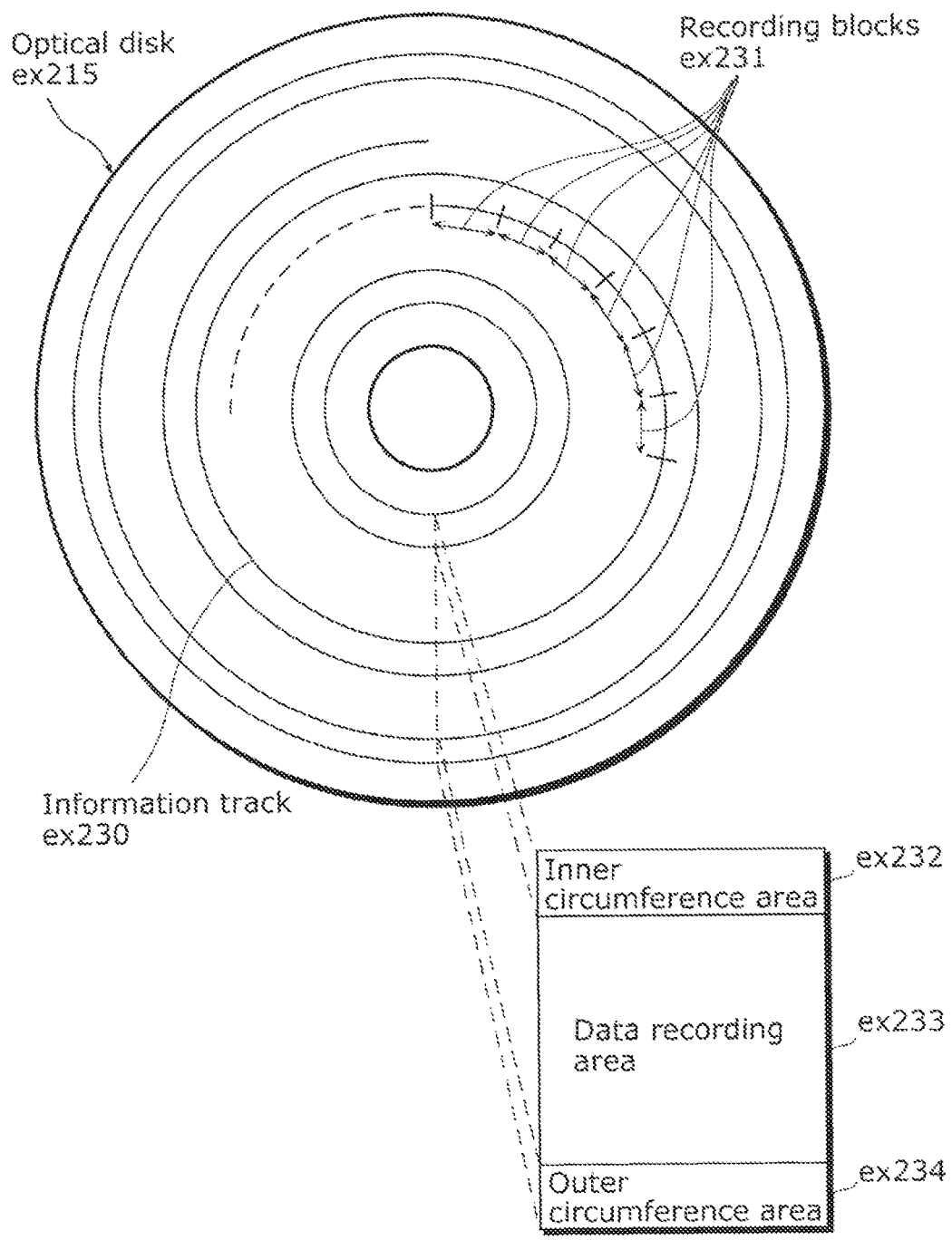
FIG. 29 shows an example of a configuration of a recording medium that is an optical disk.

FIG. 29 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit ex400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 27. The same will be true for the configuration of the computer ex111, the cellular phone ex114, and others.

Figure 30A:
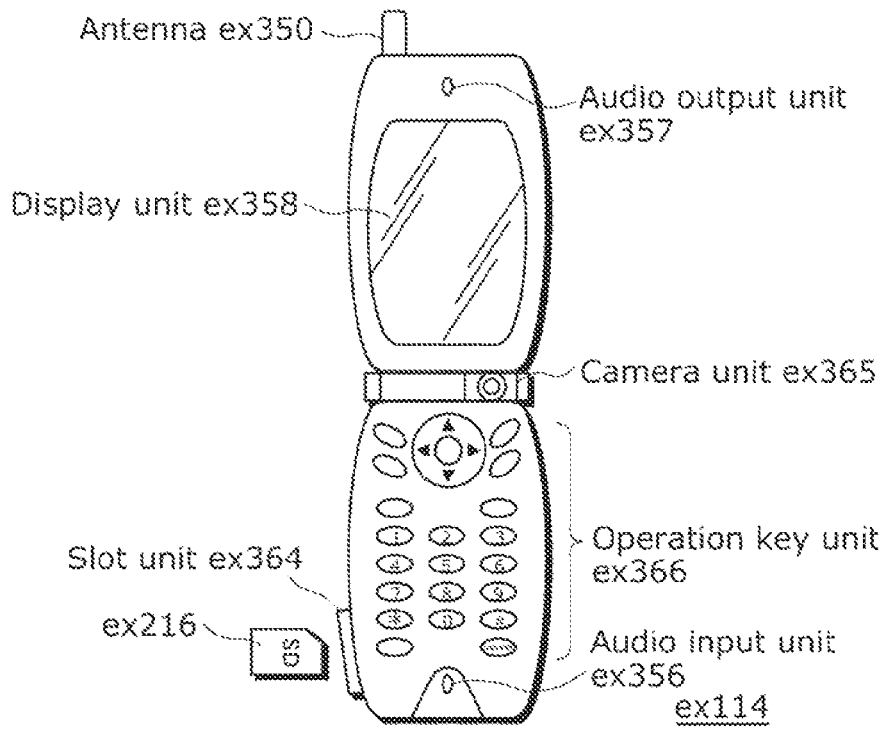
FIG. 30A shows an example of a cellular phone.

FIG. 30A illustrates the cellular phone ex114 that uses the moving picture coding method and the moving picture decoding method described in Embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 30B:
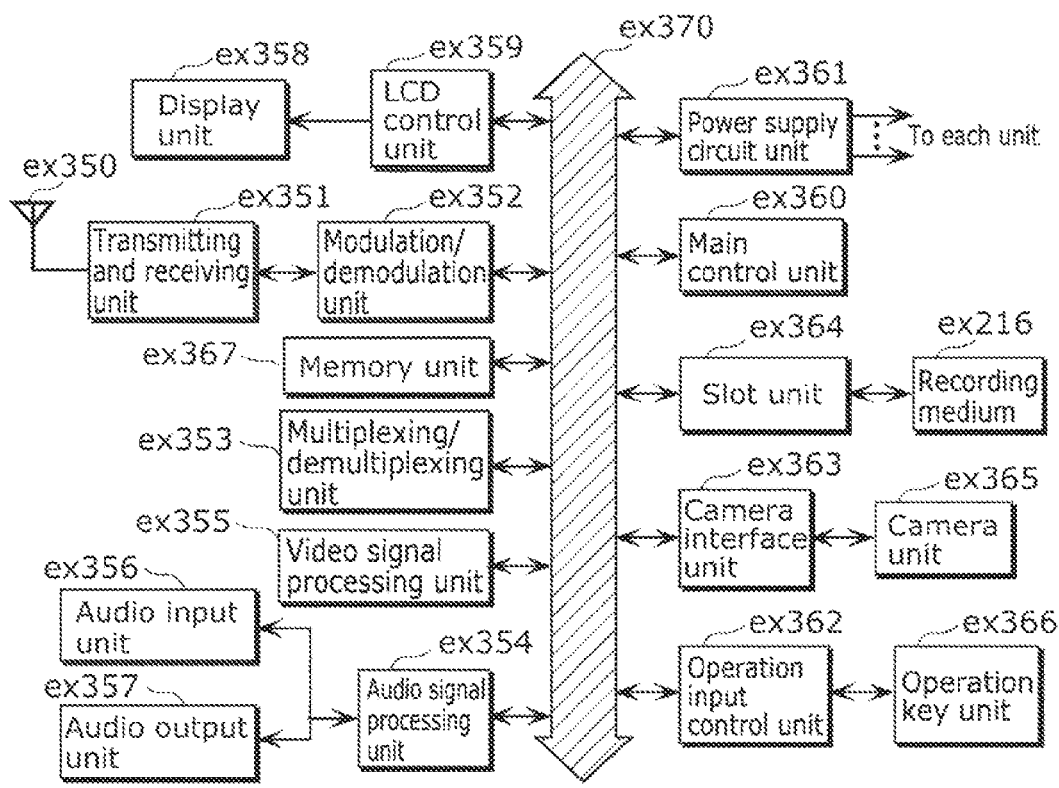
FIG. 30B shows an example of a configuration of the cellular phone.

Next, an example of a configuration of the cellular phone ex114 will be described with reference to FIG. 30B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of Embodiments, and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation circuit unit ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the coding method shown in each of Embodiments, and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of Embodiments can be used in any of the devices and systems described. Thus, the advantages described in each of Embodiments can be obtained.

Furthermore, the present invention is not limited to Embodiments, and various modifications and revisions are possible without departing from the scope of the present invention.

[Embodiment 8]

Video data can be generated by switching, as necessary, between (i) the moving picture coding method or the moving picture coding apparatus shown in each of Embodiments and (ii) a moving picture coding method or a moving picture coding apparatus in conformity with a different standard; such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of Embodiments will be hereinafter described. The multiplexed data is a digital stream in the MPEG2-Transport Stream format.

Figure 31:
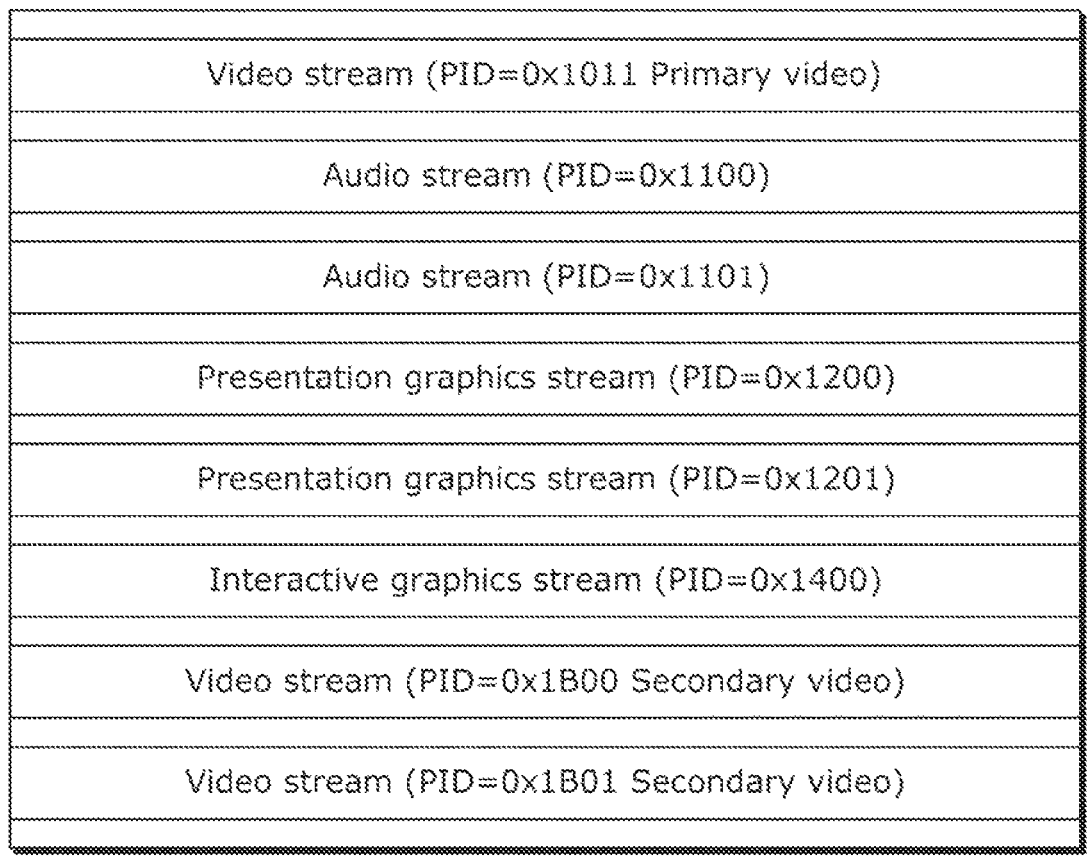
FIG. 31 shows a structure of multiplexed data.

FIG. 31 illustrates a structure of the multiplexed data. As illustrated in FIG. 31, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics to stream represents an interactive screen to be generated by arranging the GUI components on a screen. The video stream is coded in the moving picture coding method or by the moving picture coding apparatus shown in each of Embodiments, or in a moving picture coding method or by a moving picture coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 32:
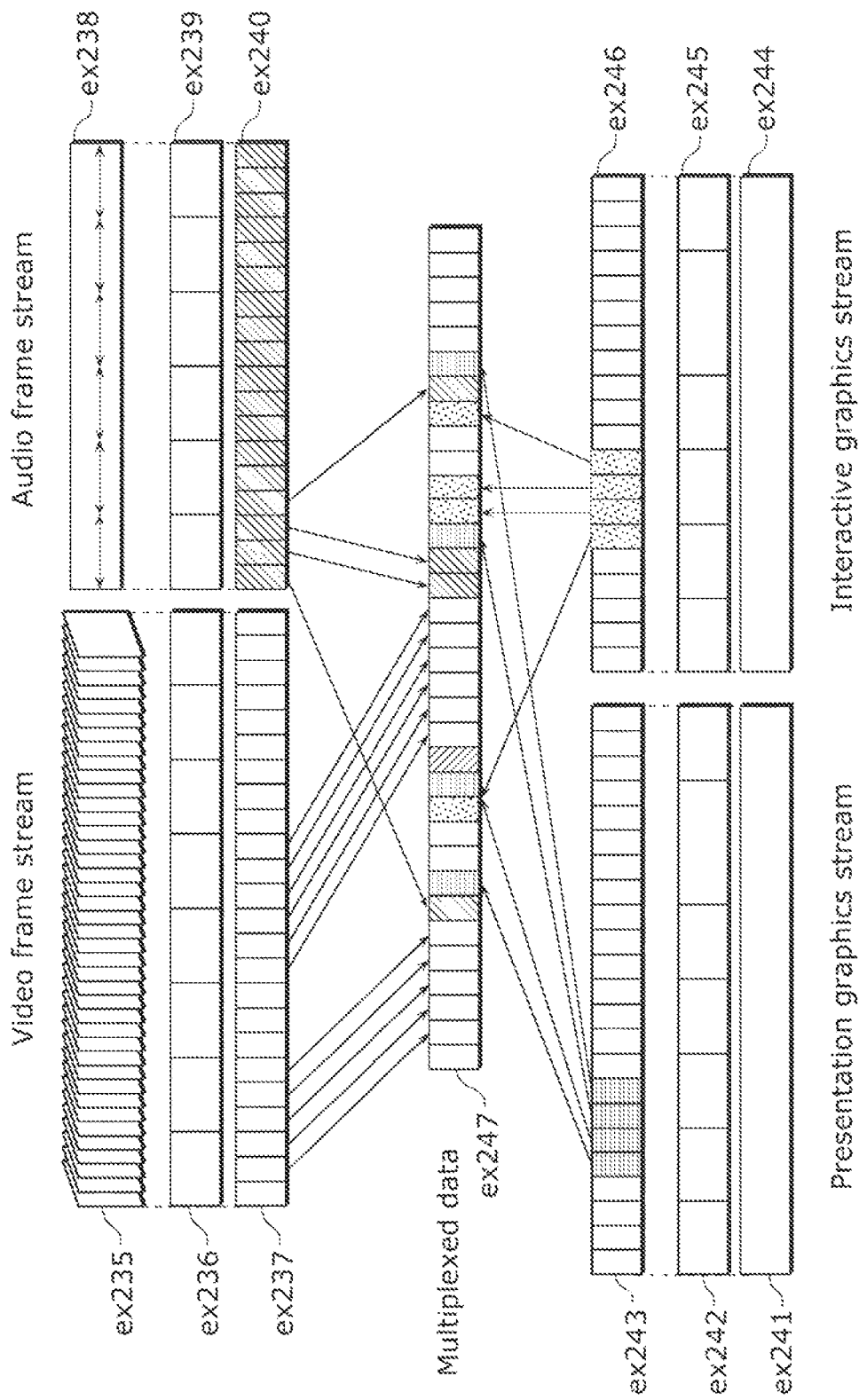
FIG. 32 schematically illustrates how each of streams is multiplexed in multiplexed data.

FIG. 32 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 33:
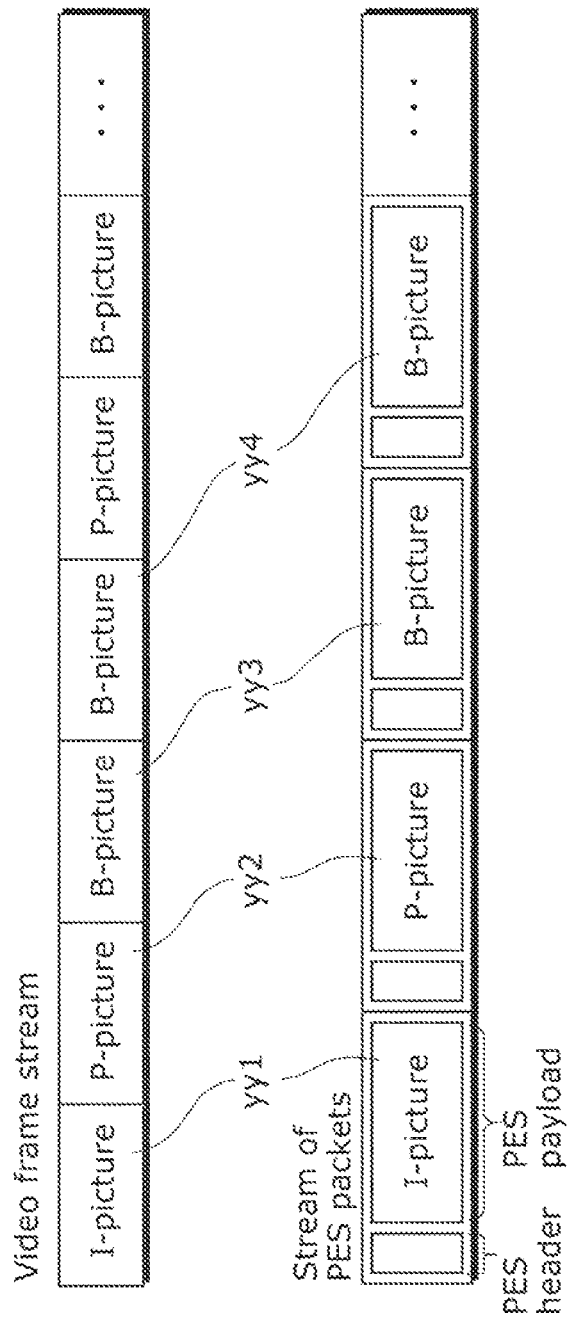
FIG. 33 illustrates how a video stream is stored in a stream of PES packets in more detail.

FIG. 33 illustrates how a video stream is stored in a stream of PES packets in more detail. The first bar in FIG. 33 shows a video frame stream in a video stream. The second bar shows the stream of PES packets. As indicated by arrows denoted as yy1, yy2, yy3, and yy4 in FIG. 33, the video stream is divided into pictures as I-pictures, B-pictures, and P-pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 34 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided; and stored in the TS payloads, respectively. When a BD ROM is used; each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 34. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 35:
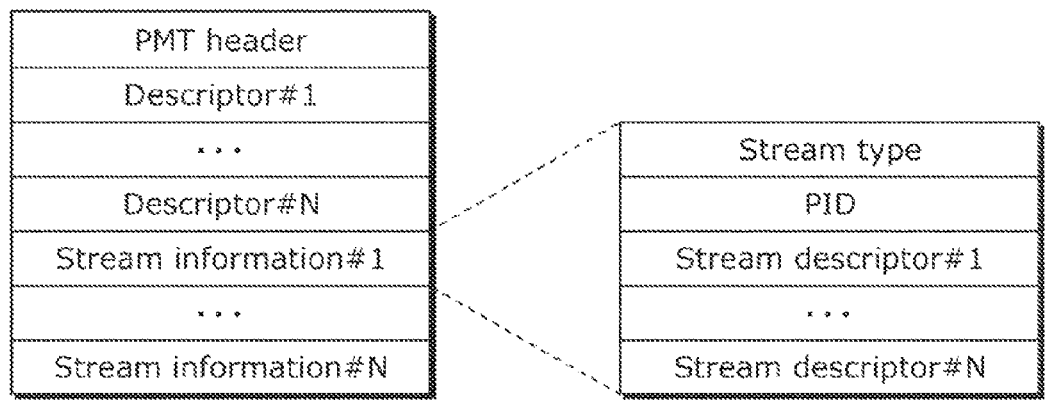
FIG. 35 shows a data structure of a PMT.

FIG. 35 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 36:
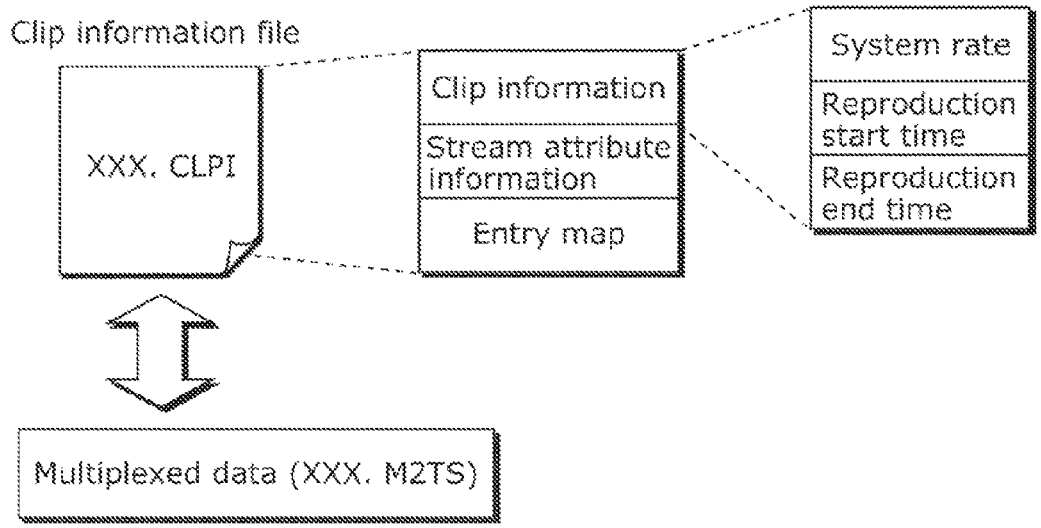
FIG. 36 shows an internal structure of multiplexed data information.

Each of the multiplexed data information files is management information of the multiplexed data as shown in FIG. 36. The multiplexed data information files are in one to one correspondence with the multiplexed data, and each of the files includes multiplexed data information, stream attribute information, and an entry map.

As illustrated in FIG. 36, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 37:
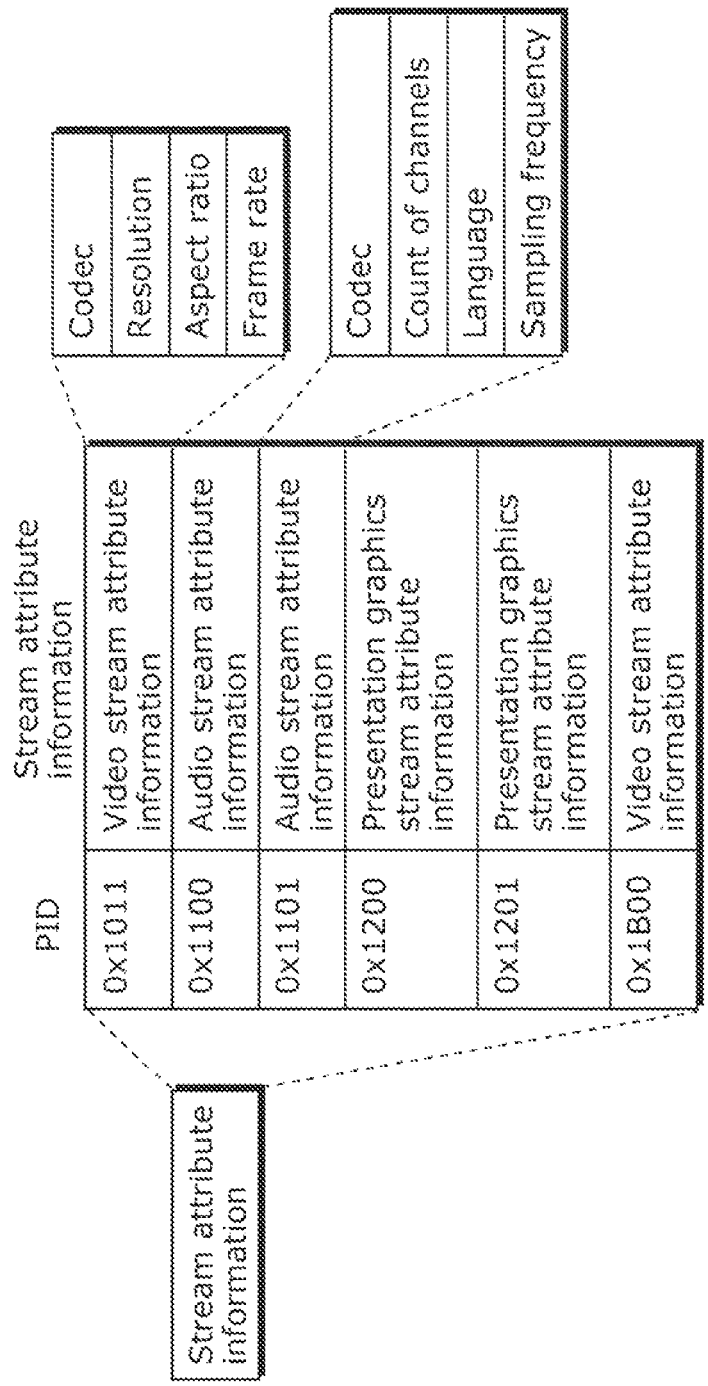
FIG. 37 shows an internal structure of stream attribute information.

As shown in FIG. 37, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In Embodiment 8, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of Embodiments includes a step or a unit for allocating unique information indicating video data generated by the moving picture coding method or the moving picture coding apparatus in each of Embodiments, to the stream type included in the PMT or the video stream attribute information. With the configuration, the video data generated by the moving picture coding method or the moving picture coding apparatus described in each of Embodiments can be distinguished from video data that conforms to another standard.

Figure 38:
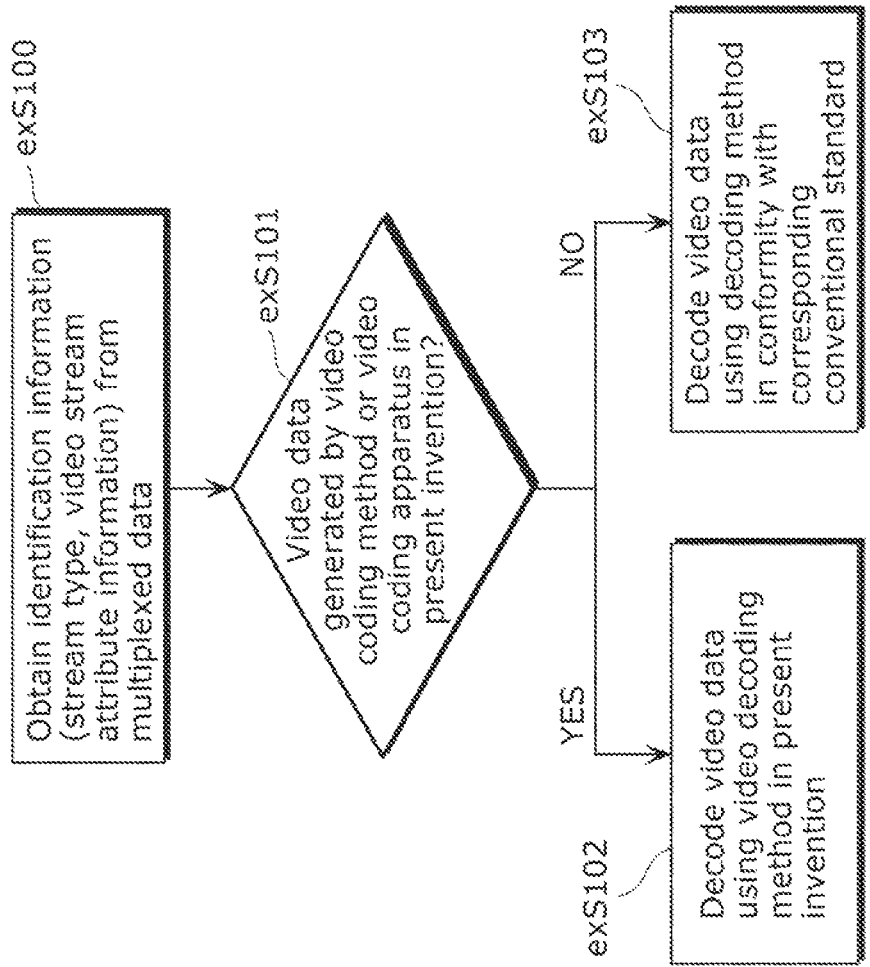
FIG. 38 shows steps for identifying video data.

Furthermore, FIG. 38 illustrates steps of the moving picture decoding method according to Embodiment 8. In Step exS100, the stream type included in the PMT or the video stream attribute information is obtained from the multiplexed data. Next, in Step exS101, it is determined whether or not the stream type or the video stream attribute information indicates that the multiplexed data is generated by the moving picture coding method or the moving picture coding apparatus in each of Embodiments. When it is determined that the stream type or the video stream attribute information indicates that the multiplexed data is generated by the moving picture coding method or the moving picture coding apparatus in each of Embodiments, in Step exS102, decoding is performed by the moving picture decoding method in each of Embodiments. Furthermore, when the stream type or the video stream attribute information indicates conformance to the conventional standards, such as MPEG-2, MPEG4-AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of Embodiments can perform decoding. Even when multiplexed data that conforms to a different standard, an appropriate decoding method or apparatus can be selected. Thus, it becomes possible to decode information without any error. Furthermore, the moving picture coding method or apparatus, or the moving picture decoding method or apparatus in Embodiment 8 can be used in the devices and systems described above.

[Embodiment 9]

Figure 39:
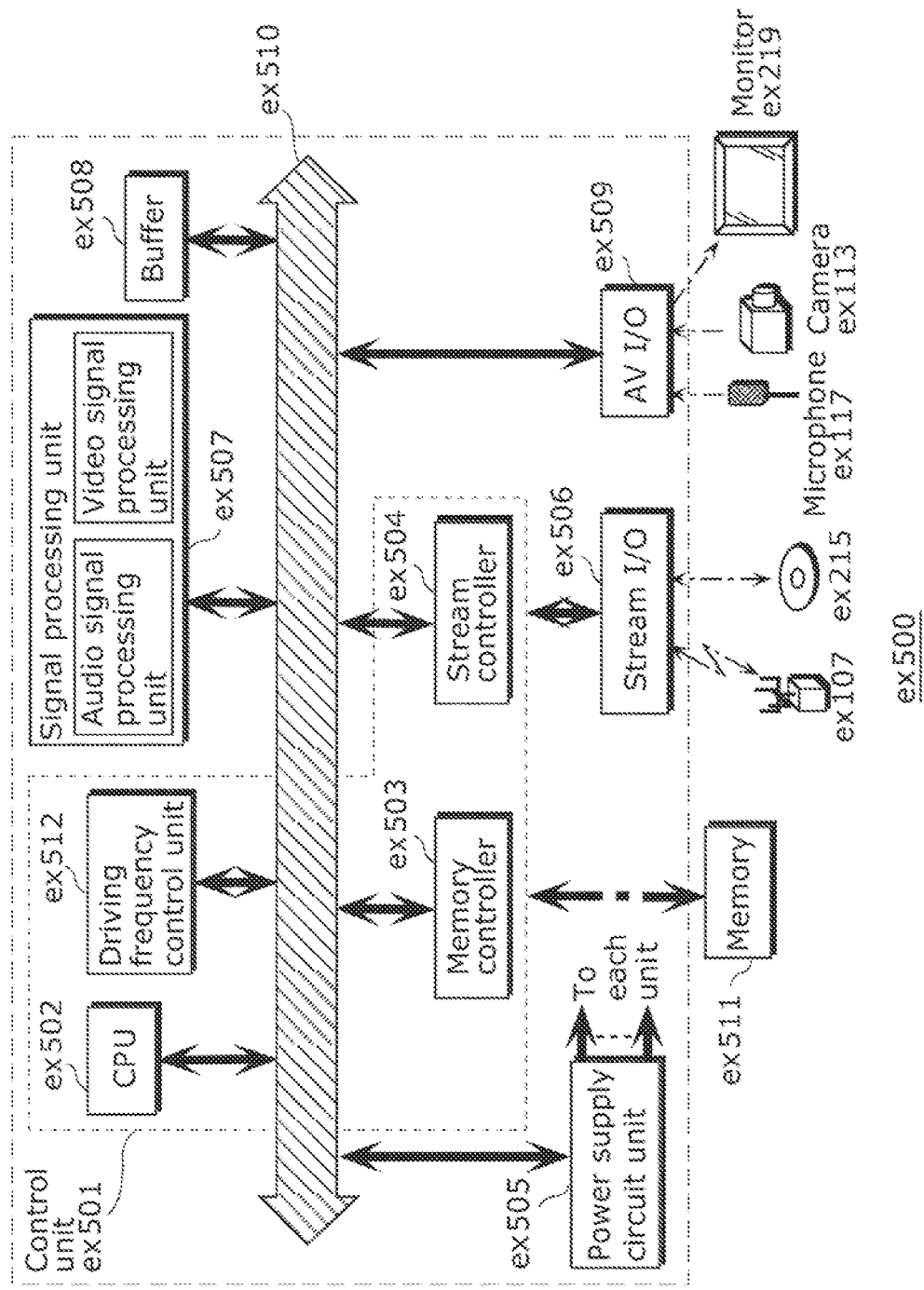
FIG. 39 is a block diagram illustrating an example of a configuration of an integrated circuit for implementing the moving picture coding method and the moving picture decoding method according to each of Embodiments.

Each of the moving picture coding method, the moving picture coding apparatus, the moving picture decoding method, and the moving picture decoding apparatus in each of Embodiments is typically achieved in the form of an integrated circuit or a Large Scale Integrated (LSI) circuit. As an example of the LSI, FIG. 39 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including in a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be is transmitted to a signal processing unit ex507. Then, the signal processing unit ex507 codes an audio signal and/or a video signal. Here, the coding of the video signal is the coding described in each of Embodiments. Furthermore, the signal processing unit ex507 sometimes multiplexes the coded audio data and the coded video data, and a stream 10 ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex510 includes the CPU ex502, the memory controller ex503, the stream controller ex504, the driving frequency control unit ex512, the configuration of the control unit ex510 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

[Embodiment 10]

When video data generated in the moving picture coding method or by the moving picture coding apparatus described in each of Embodiments is decoded, compared to when video data that conforms to a conventional standard, such as MPEG-2, MPEG4-AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 40:
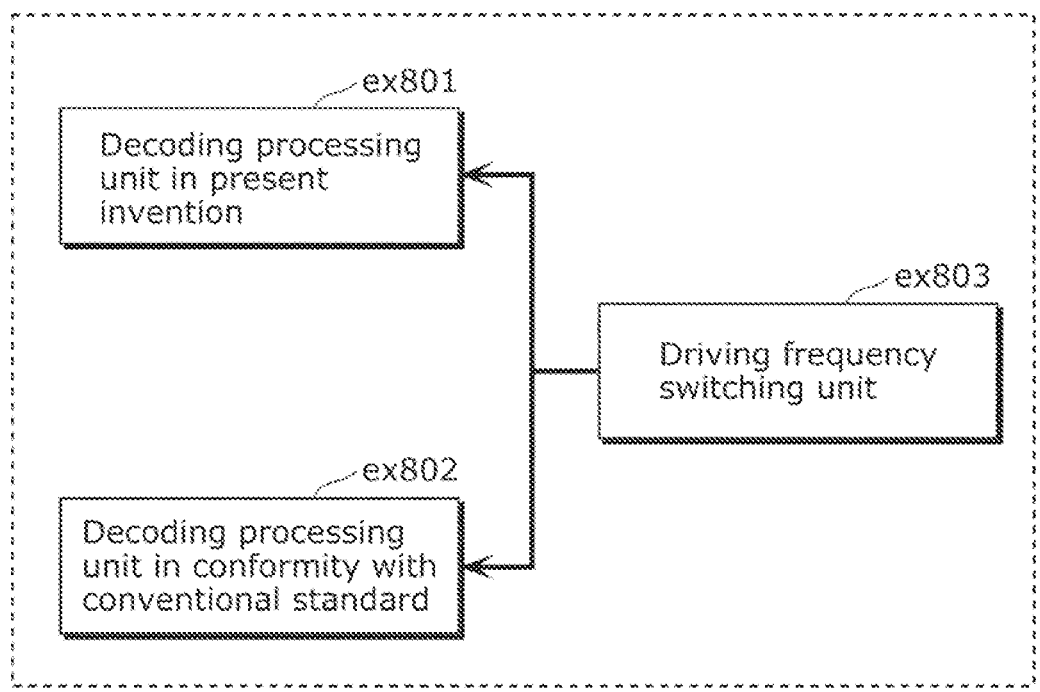
FIG. 40 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 40 illustrates a configuration ex800 in Embodiment 10. A driving frequency switching unit ex803 sets a driving frequency to a higher driving frequency when video data is generated by the moving picture coding method or the moving picture coding apparatus described in each of Embodiments. Then, the driving frequency switching unit ex803 instructs a decoding processing unit ex801 that executes the moving picture decoding method described in each of Embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of Embodiments. Then, the driving frequency switching unit ex803 instructs the decoding processing unit ex802 that conforms to the conventional standard to decode the video data.

Figures 42, 43A:
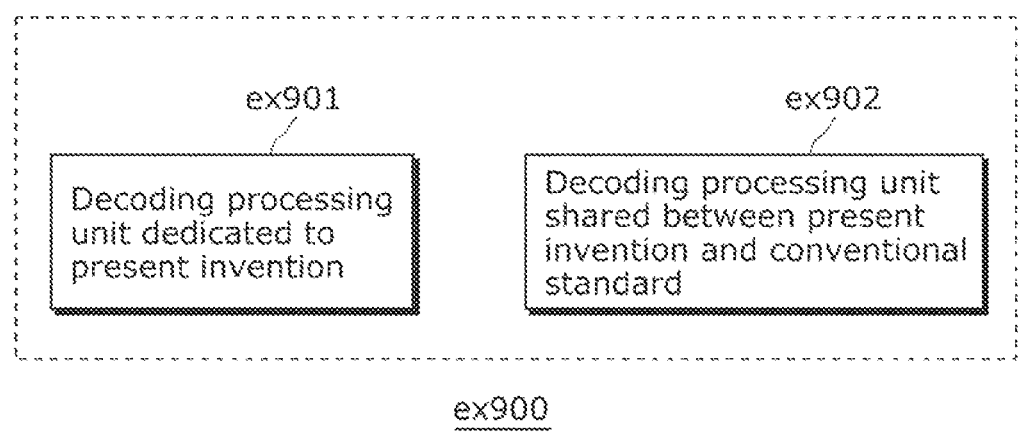
FIG. 42 shows an example of a look-up table in which standards of video data are associated with the driving frequencies.
FIG. 43A shows an example of a configuration for sharing a module of a signal processing unit.

More specifically, the driving frequency switching unit ex803 includes the CPU ex502 and the driving frequency control unit ex512 in FIG. 39. Here, each of the decoding processing unit ex801 that executes the moving picture decoding method described in each of Embodiments and the decoding processing unit ex802 that conforms to the conventional standard corresponds to the signal processing unit ex507 in FIG. 39. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 8 is probably used for identifying the video data. The identification information is not limited to the one described in Embodiment 8 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 42. The driving frequency can be selected by storing the look-up table in the buffer ex508 and in an internal memory of an LSI, and with reference to the look-up table by the CPU ex502.

Figure 41:
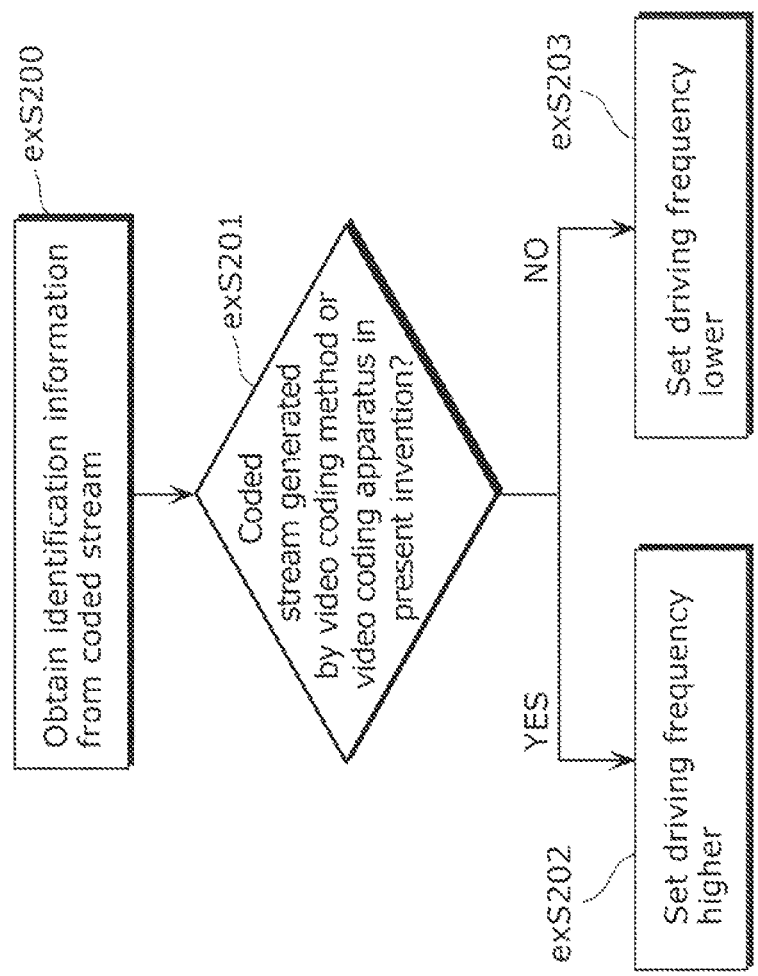
FIG. 41 shows steps for identifying video data and switching between driving frequencies.

FIG. 41 illustrates steps for executing a method in Embodiment 10. First, in Step exS200, the signal processing unit ex507 obtains identification information from the multiplexed data. Next, in Step exS201, the CPU ex502 determines whether or not the video data is generated by the coding method and the coding apparatus described in each of Embodiments, based on the identification information. When the video data is generated by the coding method and the coding apparatus described in each of Embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of Embodiments.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-AVC is larger than the processing amount for decoding video data generated by the moving picture coding method and the moving picture coding apparatus described in each of Embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of Embodiments, the voltage to be applied to the LSI ex500 or the apparatus including the LSI ex500 is probably set higher. When the identification information indicates that the video data conforms to the conventional is standard, such as MPEG-2, MPEG4-AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of Embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of Embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

[Embodiment 11]

There are cases where a plurality of video data that conforms to different standards, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of Embodiments and the decoding processing unit that conforms to the conventional standard, such as MPEG-2, MPEG4-AVC, and VC-1 are partly shared. Ex900 in FIG. 43A shows an example of the configuration. For example, the moving picture decoding method described in each of Embodiments and the moving picture decoding method that conforms to MPEG4-AVC have, partly in common, the details of processing, such as entropy coding, inverse quantization, deblocking filtering, and motion compensated prediction. The details of processing to be shared probably include use of a decoding processing unit ex902 that conforms to MPEG4-AVC. In contrast, a dedicated decoding processing unit ex901 is probably used for other processing that does not conform to MPEG4-AVC and is unique to the present invention. Since the present invention is characterized by system decoding in particular, for example, the dedicated decoding processing unit ex901 is used for system decoding. Otherwise, the decoding processing unit is probably shared for one of the inverse quantization, entropy coding, deblocking filtering, and motion compensated prediction, or all of the processing. The decoding processing unit for implementing the moving picture decoding method described in each of Embodiments may be shared for the processing to be shared, and a dedicated decoding processing unit may be used for processing unique to that of MPEG4-AVC.

Figure 43B:
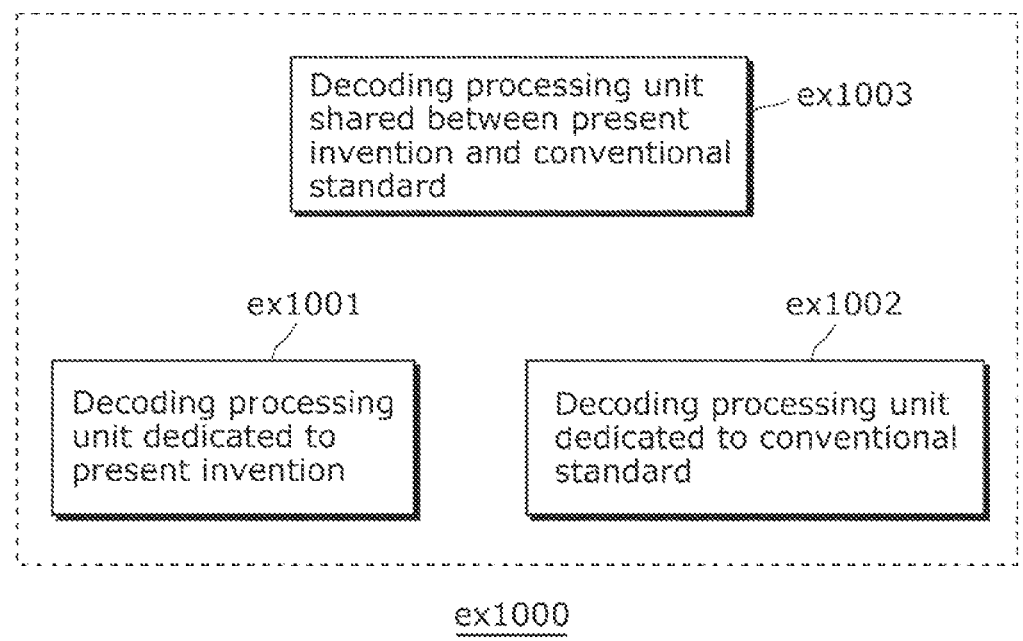
FIG. 43B shows another example of a configuration for sharing a module of a signal processing unit.

Furthermore, ex1000 in FIG. 43B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the moving picture decoding method in the present invention and the conventional moving picture decoding method. Here, the dedicated decoding processing units ex1001 and ex1002 are not necessarily specialized for the processing of the present invention and the processing of the conventional standard, respectively, and may be the ones capable of implementing general processing. Furthermore, the configuration of Embodiment 11 can be implemented by the LSI ex500.

As such, reducing the scale of the circuit of an LSI and reducing the cost are possible by sharing the decoding processing unit for the processing to be shared between the moving picture decoding method in the present invention and the moving picture decoding method in conformity with the conventional standard.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The image coding method and the image decoding method according to the present invention are applicable to, for example, televisions, digital video recorders, car navigation systems, mobile phones, digital cameras, digital video cameras, and so on.

What is claimed is:

1. An image coding method comprising: a video layer of generating a coded stream by coding an image composed of one or more pictures; and a system layer of generating a system stream for transmitting or storing the coded stream,
said video layer comprising
coding the image to generate the coded stream, and
said system layer comprising
multiplexing the coded stream generated in said coding and an identifier to generate the system stream, the identifier indicating whether or not a format of the image is a left-right mixed format that includes a base layer and an enhancement layer for providing a plurality of degrees of accuracy and that has a left view image area and a right view image area in each picture,
wherein said system layer is compliant with MPEG-2 Systems,
said coding includes, in the case where the format of the image is the left-right mixed format, coding the image that includes the base layer and the enhancement layer and that has the left view image area and the right view image area in each picture, to generate the coded stream,
said multiplexing includes (i) in the case where said video layer is compliant with a multiview video coding scheme in the MPEG-2 Systems, inserting the identifier in a first descriptor defined for the multiview video coding scheme in the MPEG-2 Systems, and multiplexing the coded stream and the first descriptor that includes the identifier, to generate the system stream, and (ii) in the case where said video layer is compliant with a scalable video coding scheme in the MPEG-2 Systems, inserting the identifier in a second descriptor defined for the scalable video coding scheme in the MPEG-2 Systems, and multiplexing the coded stream and the second descriptor that includes the identifier, to generate the system stream,
the first descriptor includes attribute information of the coded stream obtained by coding the image according to the multiview video coding scheme, and the second descriptor includes attribute information of the coded stream obtained by coding the image according to the scalable video coding scheme, and
in said multiplexing, (i) in the case where said video layer is compliant with a multiview video coding scheme in the MPEG-2 Systems, the identifier is inserted (a) between maximum_bitrate and view_order_index_min or (b) after no_prefix_nal_unit_present in the first descriptor, and (ii) in the case where said video layer is compliant with a scalable video coding scheme in the MPEG-2 Systems, the identifier is inserted (a) between dependency id and quality_id_start or (b) after no_sei_nal_unit_present in the second descriptor.

2. The image coding method according to claim 1,
wherein said video layer is compliant with the multiview video coding scheme, and
said coding includes coding the image, using an MVC encoder that performs inter-view prediction, according to the multiview video coding scheme to generate the coded stream.

3. The image coding method according to claim 2,
wherein said video layer is compliant with H.264 MVC,
the first descriptor defined for the multiview video coding scheme is an MVC descriptor defined for H.264 MVC in the MPEG-2 Systems,
said coding includes coding the image according to H.264 MVC to generate the coded stream, and
said multiplexing includes inserting the identifier in the MVC descriptor defined for H.264 MVC, and multiplexing the coded stream and the MVC descriptor that includes the identifier, to generate the system stream.

4. The image coding method according to claim 2,
wherein said coding includes:
coding the image of the left-right mixed format in the case where the format of the image is the left-right mixed format; and
coding the image of a left-right independent format in the case where the format of the image is not the left-right mixed format, the left-right independent format being a format that includes a picture of a left view and a picture of a right view as separate pictures.

5. The image coding method according to claim 1,
wherein said video layer is compliant with the scalable video coding scheme,
said coding includes coding the image, using an SVC encoder that provides a plurality of degrees of accuracy, according to the scalable video coding scheme to generate the coded stream.

6. The image coding method according to claim 5,
wherein said video layer is compliant with H.264 SVC,
the second descriptor defined for the scalable video coding scheme is an SVC descriptor defined for H.264 SVC in the MPEG-2 Systems,
said coding includes coding the image according to H.264 SVC to generate the coded stream, and
said multiplexing includes inserting the identifier in the SVC descriptor defined for H.264 SVC, and multiplexing the coded stream and the SVC descriptor that includes the identifier, to generate the system stream.

7. The image coding method according to claim 5, wherein said coding includes:
coding the image for stereoscopic display in the case where the format of the image is the left-right mixed format; and
coding the image for monoscopic display in the case where the format of the image is not the left-right mixed format.

8. The image coding method according to claim 1, further comprising
generating the image in the left-right mixed format by (i) generating, as a picture of the base layer, a picture in which a first portion of a left picture that is a picture of a left view is included in the left view image area and a second portion of a right picture that is a picture of a right view is included in the right view image area, and (ii) generating, as a picture of the enhancement layer, a picture in which a third portion of the left picture is included in the left view image area and a fourth portion of the right picture is included in the right view image area, the third portion being different from the first portion, and the fourth portion being different from the second portion,
wherein said coding includes coding the image generated in said generating to generate the coded stream, when coding the image of the left-right mixed format.

9. The image coding method according to claim 1, further comprising
generating the image in the left-right mixed format by (i) generating, as a picture of the base layer, a picture in which a first portion of a left picture that is a picture of a left view is included in the left view image area and a second portion of a right picture that is a picture of a right view is included in the right view image area, and (ii) generating, as a picture of the enhancement layer, a picture in which the whole left picture or a third portion of the left picture is included in the left view image area and the whole right picture or a fourth portion of the right picture is included in the right view image area, the third portion including the first portion, and the fourth portion including the second portion,
wherein said coding includes coding the image generated in said generating to generate the coded stream, when coding the image of the left-right mixed format.

10. An image decoding method comprising: a system layer of obtaining, from a system stream for transmitting or storing a coded stream that includes an image composed of one or more pictures, the coded stream; and a video layer of decoding the image included in the coded stream,
said system layer comprising
demultiplexing the system stream into the coded stream and an identifier to obtain the coded stream and the identifier, the identifier indicating whether or not a format of the image is a left-right mixed format that includes a base layer and an enhancement layer for providing a plurality of degrees of accuracy and that has a left view image area and a right view image area in each picture,
said video layer comprising
decoding the image included in the coded stream obtained in said demultiplexing, and
said image decoding method further comprising
outputting the image decoded in said decoding, in an output mode specified according to the identifier obtained in said demultiplexing,
wherein said system layer is compliant with MPEG-2 Systems,
said demultiplexing includes (i) in the case where said video layer is compliant with a multiview video coding scheme in the MPEG-2 Systems, demultiplexing the system stream into the coded stream and a first descriptor defined for the multiview video coding scheme in the MPEG-2 Systems, to obtain the coded stream and the identifier included in the first descriptor, and (ii) in the case where said video layer is compliant with a scalable video coding scheme in the MPEG-2 Systems, demultiplexing the system stream into the coded stream and a second descriptor defined for the scalable video coding scheme in the MPEG-2 Systems, to obtain the coded stream and the identifier included in the second descriptor,
the first descriptor includes attribute information of the coded stream obtained by coding the image according to the multiview video coding scheme, and the second descriptor includes attribute information of the coded stream obtained by coding the image according to the scalable video coding scheme,
in the case where the format of the image is the left-right mixed format, the image includes the base layer and the enhancement layer and has the left view image area and the right view image area in each picture, and
in said demultiplexing, (i) in the case where said video layer is compliant with a multiview video coding scheme in the MPEG-2 Systems, the identifier is obtained from (a) between maximum_bitrate and view_order_index_min or (b) after no_prefix_nal_unit_present in the first descriptor, and (ii) in the case where said video layer is compliant with a scalable video coding scheme in the MPEG-2 Systems, the identifier is obtained from (a) between dependency_id and quality_id_start or (b) after no_sei_nal_unit_present in the second descriptor.

11. The image decoding method according to claim 10, wherein said video layer is compliant with the multiview video coding scheme, and
said decoding includes decoding the image coded according to the multiview video coding scheme, using an MVC decoder that performs inter-view prediction.

12. The image decoding method according to claim 11, wherein said video layer is compliant with H.264 MVC,
the first descriptor defined for the multiview video coding scheme is an MVC descriptor defined for H.264 MVC in the MPEG-2 Systems,
said demultiplexing includes demultiplexing the system stream into the coded stream and the MVC descriptor defined for H.264 MVC, to obtain the coded stream and the identifier included in the MVC descriptor, and
said decoding includes decoding the image coded according to H.264 MVC.

13. The image decoding method according to claim 11, wherein said decoding includes:
decoding the image of the left-right mixed format in the case where the format of the image is the left-right mixed format; and
decoding the image of a left-right independent format in the case where the format of the image is not the left-right mixed format, the left-right independent format being a format that includes a picture of a left view and a picture of a right view as separate pictures.

14. The image decoding method according to claim 10, wherein said video layer is compliant with the scalable video coding scheme, and said decoding includes decoding the image coded according to the scalable video coding scheme, using an SVC decoder that provides a plurality of degrees of accuracy.

15. The image decoding method according to claim 14, wherein said video layer is compliant with H.264 SVC, the second descriptor defined for the scalable video coding scheme is an SVC descriptor defined for H.264 SVC in the MPEG-2 Systems,
said demultiplexing includes demultiplexing the system stream into the coded stream and the SVC descriptor defined for H.264 SVC, to obtain the coded stream and the identifier included in the SVC descriptor, and
said decoding includes decoding the image coded according to H.264 SVC.

16. The image decoding method according to claim 14, wherein said decoding includes:
decoding the image for stereoscopic display in the case where the format of the image is the left-right mixed format; and
decoding the image for monoscopic display in the case where the format of the image is not the left-right mixed format.

17. The image decoding method according to claim 10, further comprising
generating a left picture that is a picture of a left view and a right picture that is a picture of a right view, in the case where the format of the image is the left-right mixed format,
said generating includes:
obtaining a first portion of the left picture from the left view image area in a base layer picture, the base layer picture being a picture of the base layer and being included in the image decoded in said decoding;
obtaining a second portion of the right picture from the right view image area in the base layer picture;
obtaining a third portion of the left picture from the left view image area in an enhancement layer picture, the enhancement layer picture being a picture of the enhancement layer and being included in the image decoded in said decoding, the third portion being different from the first portion;
obtaining a fourth portion of the right picture from the right view image area in the enhancement layer picture, the fourth portion being different from the second portion;
generating the left picture from the obtained first portion and the obtained third portion; and
generating the right picture from the obtained second portion and the obtained fourth portion, and
said outputting includes outputting, as the image, the left picture and the right picture generated in said generating, in the case where the format of the image is the left-right mixed format.

18. The image decoding method according to claim 10, further comprising
generating, in the case where the format of the image is the left-right mixed format, a left picture from the left view image area in a decoded picture and a right picture from the right view image area in the decoded picture, the left picture being a picture of a left view, the right picture being a picture of a right view, and the decoded picture being a picture of one of the base layer and the enhancement layer and being included in the image decoded in said decoding,
wherein said outputting includes outputting, as the image, the left picture and the right picture generated in said generating, in the case where the format of the image is the left-right mixed format.

19. An image coding apparatus comprising: a video layer unit configured to generate a coded stream by coding an image composed of one or more pictures; and a system layer unit configured to generate a system stream for transmitting or storing the coded stream,
said video layer unit comprising
a coding unit configured to code the image to generate the coded stream, and
said system layer unit comprising
a multiplexing unit configured to multiplex the coded stream generated by said coding unit and an identifier to generate the system stream, the identifier indicating whether or not a format of the image is a left-right mixed format that includes a base layer and an enhancement layer for providing a plurality of degrees of accuracy and that has a left view image area and a right view image area in each picture,
wherein said system layer unit is compliant with MPEG-2 Systems,
said coding unit is configured to, in the case where the format of the image is the left-right mixed format, code the image that includes the base layer and the enhancement layer and that has the left view image area and the right view image area in each picture, to generate the coded stream,
said multiplexing unit is configured to (i) in the case where said video layer unit is compliant with a multiview video coding scheme in the MPEG-2 Systems, insert the identifier in a first descriptor defined for the multiview video coding scheme in the MPEG-2 Systems, and multiplex the coded stream and the first descriptor that includes the identifier, to generate the system stream, and (ii) in the case where said video layer unit is compliant with a scalable video coding scheme in the MPEG-2 Systems, insert the identifier in a second descriptor defined for the scalable video coding scheme in the MPEG-2 Systems, and multiplex the coded stream and the second descriptor that includes the identifier, to generate the system stream,
the first descriptor includes attribute information of the coded stream obtained by coding the image according to the multiview video coding scheme, and the second descriptor includes attribute information of the coded stream obtained by coding the image according to the scalable video coding scheme, and
said multiplexing unit, (i) in the case where said video layer is compliant with a multiview video coding scheme in the MPEG-2 Systems, the identifier is inserted (a) between maximum_bitrate and view_order_index_min or (b) after no_prefix_nal_unit_present in the first descriptor, and (ii) in the case where said video layer is compliant with a scalable video coding scheme in the MPEG-2 Systems, the identifier is inserted (a) between dependency_id and quality_id_start or (b) after no_sei_nal_unit_present in the second descriptor.

20. An image decoding apparatus comprising: a system layer unit configured to obtain, from a system stream for transmitting or storing a coded stream that includes an image composed of one or more pictures, the coded stream; and a video layer unit configured to decode the image included in the coded stream, said system layer unit comprising
    a demultiplexing unit configured to demultiplex the system stream into the coded stream and an identifier to obtain the coded stream and the identifier, the identifier indicating whether or not a format of the image is a left-right mixed format that includes a base layer and an enhancement layer for providing a plurality of degrees of accuracy and that has a left view image area and a right view image area in each picture,
said video layer unit comprising
    a decoding unit configured to decode the image included in the coded stream obtained by said demultiplexing unit, and
said image decoding apparatus further comprising
    an output unit configured to output the image decoded by said decoding unit, in an output mode specified according to the identifier obtained by said demultiplexing unit, wherein said system layer unit is compliant with MPEG-2 Systems,
said demultiplexing unit is configured to (i) in the case where said video layer unit is compliant with a multiview video coding scheme in the MPEG-2 Systems, demultiplex the system stream into the coded stream and a first descriptor defined for the multiview video coding scheme in the MPEG-2 Systems, to obtain the coded stream and the identifier included in the first descriptor, and (ii) in the case where said video layer unit is compliant with a scalable video coding scheme in the MPEG-2 Systems, demultiplex the system stream into the coded stream and a second descriptor defined for the scalable video coding scheme in the MPEG-2 Systems, to obtain the coded stream and the identifier included in second descriptor,
the first descriptor includes attribute information of the coded stream obtained by coding the image according to the multiview video coding scheme, and the second descriptor includes attribute information of the coded stream obtained by coding the image according to the scalable video coding scheme,
in the case where the format of the image is the left-right mixed format, the image includes the base layer and the enhancement layer and has the left view image area and the right view image area in each picture, and
said demultiplexing unit, (i) in the case where said video layer is compliant with a multiview video coding scheme in the MPEG-2 Systems, the identifier is obtained from (a) between maximum_bitrate and view_order_index_min or (b) after no_prefix_nal_unit_present in the first descriptor, and (ii) in the case where said video layer is compliant with a scalable video coding scheme in the MPEG-2 Systems, the identifier is obtained from (a) between dependency_id and quality_id_start or (b) after no_sei_nal_unit_present in the second descriptor.

* * * * *